(12) United States Patent
Malm et al.

(10) Patent No.: US 8,139,889 B2
(45) Date of Patent: Mar. 20, 2012

(54) METHOD, AN APPARATUS AND A COMPUTER-READABLE MEDIUM FOR PROCESSING A NIGHT VISION IMAGE DATASET

(75) Inventors: Henrik Malm, Lund (SE); Eric Warrant, Lund (SE); Jonas Ambeck-Madsen, Brussels (BE); Hiromichi Yanagihara, Woluwe St. Pierre (BE); Magnus Oskarsson, Malmö (SE)

(73) Assignees: Toyota Motor Europe NV, Brussels (BE); Lund University, Lund (SE)

( * ) Notice: Subject to any disclaimer, the term of this patent is extended or adjusted under 35 U.S.C. 154(b) by 604 days.

(21) Appl. No.: 12/377,793

(22) PCT Filed: Aug. 16, 2007

(86) PCT No.: PCT/EP2007/007229
§ 371 (c)(1),
(2), (4) Date: Feb. 17, 2009

(87) PCT Pub. No.: WO2008/019846
PCT Pub. Date: Feb. 21, 2008

(65) Prior Publication Data
US 2010/0284626 A1   Nov. 11, 2010

(30) Foreign Application Priority Data
Aug. 16, 2006 (EP) .................................. 06119041

(51) Int. Cl.
*G06K 9/00* (2006.01)
*G06K 9/40* (2006.01)

(52) U.S. Cl. ........................................ 382/261; 382/100
(58) Field of Classification Search .......... 382/124–127, 382/254–275
See application file for complete search history.

(56) References Cited

U.S. PATENT DOCUMENTS 5,613,014 A * 3/1997 Eshera et al. ................. 382/124
5,920,641 A * 7/1999 Ueberreiter et al. .......... 382/125

OTHER PUBLICATIONS

Allen M. Waxman, Solid-State Color Night Vision: Fusion of Low-Light Visible and Thermal Infrared Imagery, 1998, vol. 11, No. 1.*
Yang G. Z. et al.: "Structure Adaptive Anisotropic Image Filtering". Image and Vision Computing; vol. 14, pp. 135-145, Mar. 2006, XP001058181.

(Continued)

*Primary Examiner* — Alex Liew
(74) *Attorney, Agent, or Firm* — Bacon & Thomas, PLLC

(57) ABSTRACT

Method for processing a sequence of at least two image datasets each having at least two pixels, each pixel having an intensity value by calculating a structure tensor for each pixel in an image dataset included in the sequence of image datasets; calculating values in a summation kernel based on the structure tensor for each pixel in the image dataset; calculating a weighted intensity value for each pixel in the first image dataset, using as weights the values in the summation kernel; storing the weighted intensity value for each pixel in the image dataset as a processed intensity value for each corresponding pixel in a processed output image dataset; rotating a local coordinate system in which the summation kernel is described so that the coordinate axes of said local coordinate system coincide with the directions of the eigenvectors of the structure tensor.

19 Claims, 9 Drawing Sheets

OTHER PUBLICATIONS

Dietmar Uttenweiler et al.: "Spatiotemporal anistropic diffusion filtering to improve signal-to-noise ratios and object restoration in fluorescence microscopic image sequences", Journal of Biomedical Optics; vol. 8, No. 1, Jan. 2008, pp. 40-47, XP000526001.

James C. Brailean et al.: "Noise Reduction Filter for Dynamic Image Sequences: A Review", Proceedings of the IEEE; vol. 83, No. 9, Sep. 1, 1995, pp. 1272-1291, XP000526001.

G. Deng et al.:"An adaptive Gaussian Filter for Noise Reduction and Edge Detection" Nuclear Science Symposium and Medical Imaging Conference, Nuclear Science Symposium and Medical Imaging Conference, Oct. 31, 1993, pp. 1615-1619, XP010119378.

"Laplacian/Laplacian of Gaussian", Internet Citation, 2003, XP007904097.

Hanno Scharr et al.: "Accurate Optical Flow in Noisy Image Sequences Using Flow Adapted Anisotropic Diffusion", Signal Processing: Image Communication; Jul. 9, 2005, vol. 20, No. 6, pp. 537-553, XP004924112.

Shlomo Greenberg et al.: "Improved Structure—Adaptive Anisotropic Filter", Pattern Recognition Letters; Jan. 1, 2006, vol. 27, No. 1, pp. 59-65, XP005159001.

International Search Report with regard to PCT/EP20071007229, Jan. 23, 2009.

Examination Report of European Patent Office regarding European patent application No. 07801686.2, Aug. 3, 2009.

Examination Report of IP Australia regarding Australia Patent Application No. 2007286480, Jul. 28, 2011.

* cited by examiner

METHOD, AN APPARATUS AND A COMPUTER-READABLE MEDIUM FOR PROCESSING A NIGHT VISION IMAGE DATASET

TECHNICAL FIELD

The present invention generally relates to the field of image processing. More particularly the present invention relates to methods, apparatuses, computer programs and computer-readable mediums for enhancing the dynamic level, such as, e.g., reducing noise in a noisy image dataset, particularly, but not limited to image datasets with areas of low contrast such as image datasets or image dataset sequences obtained in low light level conditions, e.g. night vision datasets, or in other conditions of relatively poor visibility.

DESCRIPTION OF RELATED ART

In digital image processing, noise more or less corresponds to visible grain present in an image dataset. The term noise generally refers to the high frequency random perturbations that are generally caused by electronic noise in the input device sensor and circuitry (e.g. scanner, digital camera). In dim light conditions, e.g. during night vision, another source for noise is the quantum nature of light. Since very few photons reach the camera film or CCD detector the uncertainty in the true intensity value is in general large. That is, the variance of the intensity is large compared to the true value and that leads to a grainy noisy image. The combination of this large variance and the added internal electronic noise in the imaging device may lead to disturbing levels of noise. Noise reduction is a part of image analysis that strives to reduce noise in an image dataset.

Many animals, especially those with a nocturnal lifestyle, have excellent visual capabilities in dim light conditions and possess means of dealing with the inevitable noise. A feature of most animal visual systems, including the human, is the ability to sum the visual signal locally in space (spatial summation) and time (temporal summation) to increase signal strength in each input channel and to improve the reliability of the intensity estimations. However, this comes at the cost of lower spatial and/or temporal resolution. For animals having to react to high-speed events and/or that are moving with a high relative velocity, high temporal resolution is generally needed, and spatial summation is favored before temporal summation. For other animals that are mostly active in more static environments, temporal summation is instead favored in order to obtain as high a spatial resolution as possible.

In the publication "Seeing better at night: life style, eye design and the optimum strategy of spatial and temporal summation", by E. Warrant, Vision Research, 39:1611-1630, 1999, a model is provided that attempts to resemble visual signal processing in animal eyes that takes spatial and temporal summation into consideration. This model tries to find the optimal balance of spatial and temporal summation that maximizes visual performance. By studying the visual systems of a number of specific animals, it is shown that the relative ratio of spatial and temporal summation of these animals fits well with their lifestyle and needs when it comes to temporal and spatial resolution. A drawback of the model is that it is restrictive when it comes to how the local neighborhood, over which the summation is made, may be chosen. The neighborhood is only allowed to be adjusted along the axes in the spatiotemporal space, i.e. the neighborhood is symmetric around these axes. When dealing with a pixel in a moving area of the visual field, only a small amount of temporal summation, following this model, will in general lead to motion blur. To reduce the high frequency noise, the model then instead dictates the use of a large amount of spatial blurring, which will generally lead to an unnecessary low spatial resolution. The model also assumes that a separate velocity estimation has been performed before it can be decided which amounts of spatial and temporal summation should be applied in each pixel.

When it comes to digital image processing, various attempts have been made for trying to estimate the motion trajectories corresponding to the moving areas of an image dataset through the spatiotemporal space and to reduce noise by filtering the sequence along these trajectories. Moving areas in an image dataset may occur e.g. by moving the camera while obtaining the image dataset and/or by obtaining an image dataset of one or more moving objects within the image dataset, using a stationary or moving camera. These noise reduction techniques are usually referred to as motion-compensated spatiotemporal filtering. In this way the motion blur is, ideally, avoided and the need for spatial filtering reduced. In some of these techniques weighted averages, depending on estimates of the noise level, are calculated in a small neighborhood along and around the motion trajectories. Other filtering techniques, such as so-called linear minimum mean square error filtering and Kalman and/or Wiener filtering, have been proposed to be applied along the motion trajectories. A drawback of the motion-compensating methods is that they rely rather heavily on a good estimation of the motion trajectory in every point being calculated separately before the filtering is applied. A slight error in the motion estimation will thus generally lead to excessive blurring. The explicit estimation of the motion trajectories is especially complicated for sequences severely degraded by noise. Generally, the filtering is simply reduced in areas where the motion estimation is especially difficult, e.g. at object contours, generally leading to poor noise reduction in those areas.

Other noise reducing video processing methods use a cascade of directional filters where the filtering and smoothing is done primarily in the direction which corresponds to the filter which gives the highest output. These methods work well for directions that coincide with the fixed filter directions, but in general have a pronounced degradation in the output for directions in between the filter directions.

The publication "Nonlinear image filtering with edge and corner enhancement" by Nitzberg and Shiota, IEEE Trans. On Pattern Recognition and Machine Intelligence, 14:826-833, 1992, discloses a method of nonlinear image filtering for noise reduction in a single 2D image dataset. According to this method, Gaussian shaped kernels are calculated that adapt to the local spatial intensity structure at each pixel. These kernels are used to calculate a weighted mean value in the spatial neighborhood around each pixel. A drawback of the method disclosed in this publication is that the model only takes into account spatial summation for individual 2D image datasets, and, hence, does not address spatiotemporal summation for image datasets, i.e. noise reduction in image dataset sequences, obtained e.g. during dim light conditions. Another drawback is that the function, which relates the spatial intensity structure to the shape of the Gaussian kernel, is fixed. For example, in the case of image datasets including both very dark areas with low intensity contrast and much brighter areas, the intensity gradients that should influence the Gaussian kernels vary very much in magnitude between areas. The method presented in the above-mentioned publication has no means for dealing with this variation and will in general provide unnecessarily poor output resolution either in the dark or in the bright areas. Hence, an improved method for e.g. noise reduction in an image dataset comprising low contrast areas would be advantageous, allowing for increased image resolution, flexibility, and clarity.

G. Yang et al., in "Structure adaptive anisotropic image filtering", *Image and Vision Computing*, 14:135-145, 1996, describes structure sensitive anisotropic image filtering. The method computes a new image $f_{out}(x)$, by applying at each spatiotemporal point $x_0=(x'_0, y'_0, t'_0)$, a kernel $k(x_0, x)$ to the original image $f_{in}(x)$ such that, for example for a 2D image:

$$f_{out}(x_0) = \frac{1}{\mu(x_0)} \int\int\int_\Omega k(x_0, x) f_{in}(x) dx$$

where $$\mu(x_0) = \int\int\int_\Omega k(x_0, x) dx$$

is a normalizing factor. The normalization makes the sum of the kernel elements equal to 1 in all cases, so that the mean intensity in the image does not change. The area Q over which the integration, or in the discrete case summation, is made is chosen as a finite neighborhood centered around $x_0$. $x=(x', y', \ldots)$ is an m-dimensional position vector, for example $x=(x', y')$ is a 2D position vector.

When function k is invariant over space, it uniformly smoothes out image noise without paying any attention to image details. The basic idea behind Yang's algorithm is that the kernel $k(x_0,x)$ used should be made variable and allow to be shaped or scaled according to local features within the neighborhood $\Omega$ of $x_0$. Since it is desired to adapt the filtering to the spatiotemporal intensity structure at each point, in order to reduce blurring over spatial and temporal edges, a kernel $k(x_0,x)$ is calculated individually for each point $x_0$. The kernels should be wide in directions of homogeneous intensity (weak gradient), so that uniform regions can be smoothed out, and narrow in directions with important structural edges (strong gradient), so that edges and corners are preserved.

To find these directions, the intensity structure is analyzed by the so-called structure tensor or second moment matrix. This object has been developed and applied in image analysis in numerous papers and books, see for example B. Jähne, "Spatio-temporal image processing", Springer, 1993.

The solution of Yang is said to work very well for images with low signal to noise ratios. However, Yang does not mention night vision images.

SUMMARY OF THE INVENTION

Surprisingly, there is still a need for improved image processing for low contrast images, in particular night vision images. In particular for recognition purposes, such as pedestrian detection, the output image quality preferably has to be improved.

It is an object of embodiments of the present invention to provide a method, apparatus and software for processing a sequence of night vision image datasets. In particular, it is an advantage of embodiments of the present invention to provide a method for simultaneous noise reduction and sharpening of images in a night vision system.

Accordingly, the present invention preferably seeks to mitigate, alleviate or eliminate one or more of the above-identified deficiencies in the art and disadvantages singly or in any combination.

According to an aspect of the invention, a method for processing a sequence of image datasets, e.g. night vision image datasets, is provided. The sequence of image datasets may be provided for dynamic enhancement. The sequence comprises at least two image datasets each having at least two pixels, wherein each pixel has an intensity value. The sequence of image datasets may e.g. comprise 2D, 3D, distance image or higher-dimensional monochrome or color image datasets.

The method comprises calculating, based on estimated intensity derivatives in each pixel, a measure of an intensity structure, e.g. a structure tensor, for each pixel in an image dataset comprised in said sequence of image datasets and performing an eigen-decomposition of said measure of the intensity structure, e.g. structure tensor; calculating values in a summation kernel based on said measure of the intensity structure, e.g. tensor structure, for each pixel in said image dataset; calculating a weighted intensity value for each pixel in said image dataset, using as weights the values in said summation kernel; storing said weighted intensity value for each pixel in said image dataset as a processed intensity value for each corresponding pixel in a processed output image dataset; rotating a local coordinate system in which the summation kernel is described resulting in that the coordinate axes of said local coordinate system coincide with the directions of the eigenvectors of said measure of the intensity structure, e.g. structure tensor, where said eigenvectors are described in the global coordinate system of the image dataset, and scaling the coordinate axes of the local coordinate system in which the summation kernel is described by an amount related to the eigenvalues of the measure of the intensity structure, e.g. structure tensor, via a width function $w(\lambda_i) = \sigma_i$, and wherein said eigenvalues depend on the amount of intensity variation in the direction of their corresponding eigenvectors, the width function being a decreasing function depending on the noise level in each pixel such that $w(0) = \sigma_{max}$ and $\lim_{a \to \infty} w(a) = \sigma_{min}$.

In particular embodiments of the present invention, the width function may be defined by $$w(\lambda_i, x_0) = \begin{cases} \Delta\sigma e^{-\frac{\lambda_i}{d(x_0)} + \frac{1}{2}} + \sigma_{min}, & \lambda_i > \frac{d(x_0)}{2} \\ \sigma_{max}, & \lambda_i \leq \frac{d(x_0)}{2}. \end{cases}$$

The width function may be adapted to a noise level of the image datasets. Adapting the width function to the noise level may comprise estimating the noise in the image datasets and scaling an estimation of the variance of the noise so that the result is of a magnitude that is suitable for insertion in the width function. As a less preferred option the noise level may be a signal-to-noise level. Scaling an estimation of the variance may be performed by means of a fixed scaling factor. Alternatively, scaling an estimation of the variance may be performed by means of a scaling factor which is determined from the image dataset.

The method according to embodiments of the present invention may comprise repeating the above method steps for subsequent image datasets.

The step of calculating a measure of the intensity structure may comprise calculating a structure tensor based on estimated intensity derivatives in each pixel.

The step of calculating a measure of the intensity structure may comprise calculating a structure tensor based on the mean value of the corresponding estimated intensity derivatives for each channel in each pixel when said image dataset is a multi-channel image dataset.

The method may further comprise calculating said structure tensor for each channel in said image dataset when said image dataset is a multi-channel image dataset.

The method may further comprise calculating the element-wise mean structure tensor of said structure tensors calculated for each channel in said image dataset when said image dataset is a multi-channel image dataset.

The method may further comprise calculating said structure tensor using the mean value of the values in different channels or in each channel in said dataset when said image dataset is a multi-channel image data set.

The method may further comprise performing low-pass filtering of said image dataset before or during said step of calculating a measure of the intensity structure, e.g. the structure tensor.

The step of calculating of a measure of the intensity structure, e.g the structure tensor, may further comprise calculating motion vectors for each pixel of each image dataset of said sequence of image datasets.

The method may further comprise performing an intensity transformation on said image dataset by an intensity transformation function to increase the intensity contrast in at least a part of said first image dataset.

The method may further comprise performing a foreground-background segmentation.

The method may further comprise rendering each of said first output image dataset for presentation on a display.

The method according to embodiments of the present invention may furthermore comprise sharpening edges of contours in the image. The sharpening may be obtained by convolution of the summation kernel with a high-boost filter giving the summation kernel $\overline{S}_H$. Alternatively, the sharpening may be obtained by using a summation function $S_h$ obtained by approximating a discrete high-boost filter with a continuous function h and calculating a new summation function analytically by the convolution of the original summation kernel S with the function h, and discretizing the summation function $S_h$, giving the summation kernel $\overline{S}_h$.

According to another aspect of the invention, a computer program product comprises program instructions for causing a computer system to perform the method according to the embodiments of the present invention when said program instructions are run on a computer system. The computer program product may be embodied on a record medium, stored in a computer memory, embodied in a read-only memory, or carried on an electrical carrier signal.

According to yet another aspect of the invention, a computer-readable medium having embodied thereon a computer program for processing by a processor of a sequence of image datasets is provided. The sequence comprises at least two image datasets, each image dataset having at least two pixels, wherein each pixel has an intensity value. The computer program comprises a first calculation code segment for calculating, based on estimated intensity derivatives in each pixel, a measure of an intensity structure, e.g. a structure tensor, for each pixel in an image dataset comprised in said sequence of image datasets, and for performing an eigen-decomposition of said measure of the intensity structure, e.g. structure tensor; a second calculation code segment for calculating values in a summation kernel based on said measure of the intensity structure, e.g. structure tensor, for each pixel in said image dataset; a third calculation code segment for calculating a weighted intensity value for each pixel in said image dataset, using as weights the values in said summation kernel; a storage code segment for storing said weighted intensity value for each pixel in said image dataset as a processed intensity value for each corresponding pixel in a processed output image dataset; a further calculation code segment for rotating a local coordinate system in which the summation kernel is described resulting in that the coordinate axes of said local coordinate system coincide with the directions of the eigenvectors of said measure of the intensity structure, e.g. structure tensor, where said eigenvectors are described in the global coordinate system of the image dataset; and a scaling code segment for scaling the coordinate axes of the local coordinate system in which the summation kernel is described by an amount related to the eigenvalues of the measure of the intensity structure, e.g. structure tensor, via a width function $w(\lambda_i)=\sigma_i$, and wherein said eigenvalues depend on the amount of intensity variation in the direction of their corresponding eigenvectors, the width function being a decreasing function depending on the noise level in each pixel such that $w(0)=\sigma_{max}$ and $\lim_{a \to \infty} w(a) = \sigma_{min}$. The calculation code segment for rotating and the scaling code segment may be part of the second calculation code segment.

The width function may be a decreasing function defined by $$w(\lambda_i, x_0) = \begin{cases} \Delta \sigma e^{-\frac{\lambda_i}{d(x_0)} + \frac{1}{2}} + \sigma_{min}, & \lambda_i > \frac{d(x_0)}{2} \\ \sigma_{max}, & \lambda_i \leq \frac{d(x_0)}{2}. \end{cases}$$

The computer program may further comprise a repeating code segment for repeating the above steps for subsequent image datasets.

According to another aspect of the invention, an apparatus comprising units configured to perform the method according to the embodiments of the invention is provided.

According to a further aspect of the invention, an apparatus for processing a sequence of image datasets is provided. The sequence comprises at least two image datasets each having at least two pixels, wherein each pixel has an intensity value.

The apparatus comprises a first calculation unit for calculating, based on estimated intensity derivatives in each pixel, a measure of an intensity structure, e.g. a structure tensor, for each pixel in an image dataset comprised in said sequence of image datasets and performing an eigen-decomposition of said measure of the intensity structure, e.g. structure tensor; a second calculation unit for calculating values in a summation kernel based on said measure of the intensity structure, e.g. structure tensor, for each pixel in said image dataset; a third calculation unit for calculating a weighted intensity value for each pixel in said image dataset, using as weights the values in said summation kernel; and a storage unit for storing said weighted intensity value for each pixel in said image dataset as a processed intensity value for each corresponding pixel in a processed output image dataset. The apparatus further comprises a calculation unit for rotating a local coordinate system in which the summation kernel is described resulting in that the coordinate axes of said local coordinate system coincide with the directions of the eigenvectors of said measure of the intensity structure, e.g. structure tensor, where said eigenvectors are described in the global coordinate system of the image dataset, and a scaling unit for scaling the coordinate axes of the local coordinate system in which the summation kernel is described by an amount related to the eigenvalues of the measure of the intensity structure, e.g. structure tensor, via a width function $w(\lambda_i)=\sigma_i$, and wherein said eigenvalues depend on the amount of intensity variation in the direction of their corresponding eigenvectors, the width function being a decreasing function depending on the noise level in each pixel such that $w(0)=\sigma_{max}$ and $\lim_{a\to\infty} w(a)=\sigma_{min}$. The calculation unit for rotating and the scaling unit for scaling may be part of the second calculation unit.

In particular embodiments, the width function may be a decreasing function defined by $$w(\lambda_i, x_0) = \begin{cases} \Delta\sigma e^{-\frac{\lambda_i}{d(x_0)}+\frac{1}{2}} + \sigma_{min}, & \lambda_i > \frac{d(x_0)}{2} \\ \sigma_{max}, & \lambda_i \leq \frac{d(x_0)}{2}. \end{cases}$$

The apparatus according to embodiments of the present invention may further comprise a repeating unit for repeating the above method steps for subsequent image datasets.

According to another aspect, a method is provided for processing a sequence of night vision image datasets, wherein said sequence comprises at least two image datasets each having at least two pixels, and wherein each pixel has an intensity value. The method comprises calculating, based on estimated intensity derivatives in each pixel, a measure of an intensity structure, e.g. structure tensor, for each pixel in an image dataset comprised in said sequence of image datasets; calculating values in a summation kernel based on said measure of the intensity structure, e.g. structure tensor, for each pixel in said image dataset; calculating a weighted intensity value for each pixel in said image dataset, using as weights the values in said summation kernel; storing said weighted intensity value for each pixel in said image dataset as a processed intensity value for each corresponding pixel in a processed output image dataset. Calculating the values in the summation kernel may be performed so that, when applying the summation kernel to an input image, sharpening of contours in the input image is obtained at the most important spatial and temporal edges while smoothing is applied in the appropriate directions in the input image data.

Performing sharpening while smoothing may be obtained by using a kernel $\overline{S}_H$ obtained by convolving an anisotropic filter kernel with a high-boost filter. Alternatively, performing sharpening while smoothing may be obtained by using a kernel $\overline{S}_h$ obtained by analytically convolving a continuous approximation of a discrete high-boost filter with an anisotropic filter function and discretizing the resulting filter function.

In yet another aspect of the present invention, an apparatus is provided for processing a sequence of night vision image datasets, said sequence comprising at least two image datasets each having at least two pixels, wherein each pixel has an intensity value. The apparatus comprises a first calculation unit for calculating, based on estimated intensity derivatives in each pixel, a measure of an intensity structure, e.g. a structure tensor, for each pixel in an image dataset comprised in said sequence of image datasets, and performing an eigen-decomposition of said measure of the intensity structure, e.g. structure tensor; a second calculation unit for calculating values in a summation kernel based on said measure of the intensity structure, e.g. structure tensor, for each pixel in said image dataset; a third calculation unit for calculating a weighted intensity value for each pixel in said image dataset, using as weights the values in said summation kernel; a storage unit for storing said weighted intensity value for each pixel in said image dataset as a processed intensity value for each corresponding pixel in a processed output image dataset. The second calculation unit is adapted for calculating values in the summation kernel so that, when applying the summation kernel to an input image, sharpening of contours in the input image is obtained at the most important spatial and temporal edges while smoothing is applied in the appropriate directions in the input image data.

According to embodiments of the present invention, the second calculation unit may be adapted for performing sharpening by using a kernel $\overline{S}_H$ obtained by convolving an anisotropic filter kernel with a high-boost filter. According to alternative embodiments, the second calculation unit may be adapted for performing sharpening by using a kernel $\overline{S}_h$ obtained by analytically convolving a continuous approximation of a discrete high-boost filter with an anisotropic filter function and discretizing the resulting filter function.

According to yet another aspect of the present invention, a computer-readable medium is provided having embodied thereon a computer program for processing by a processor of a sequence of image datasets, wherein said sequence comprises at least two image datasets, each image dataset having at least two pixels, wherein each pixel has an intensity value. The computer program comprises a first calculation code segment for calculating, based on estimated intensity derivatives in each pixel, a measure of an intensity structure, e.g. a structure tensor, for each pixel in an image dataset comprised in said sequence of image datasets, and for performing an eigen-decomposition of said measure of an intensity structure, e.g. structure tensor; a second calculation code segment for calculating values in a summation kernel based on said measure of the intensity structure, e.g. structure tensor, for each pixel in said image dataset; a third calculation code segment for calculating a weighted intensity value for each pixel in said image dataset, using as weights the values in said summation kernel; a storage code segment for storing said weighted intensity value for each pixel in said image dataset as a processed intensity value for each corresponding pixel in a processed output image dataset. The second calculation code segment is adapted for calculating values in the summation kernel so that, when applying the summation kernel to an input image, sharpening of contours in the input image is obtained at the most important spatial and temporal edges while smoothing is applied in the appropriate directions in the input image data.

In a computer-readable medium according to embodiments of the present invention, the second calculation code segment may comprise code for performing sharpening by using a kernel $\overline{S}_H$ obtained by convolving an anisotropic filter kernel with a high-boost filter. According to alternative embodiments, the second calculation code segment may comprise code for performing sharpening by using a kernel $\overline{S}_h$ obtained by analytically convolving a continuous approximation of a discrete high-boost filter with an anisotropic filter function and discretizing the resulting filter function.

According to another aspect of the invention, the method, apparatus, computer program product or computer-readable medium according to any one of the embodiments of the invention is used in a vehicle, robot, video camera, surveillance system or a manufacturing system, etcetera.

According to another aspect of the invention, the method, apparatus, computer program product or computer-readable medium according to any one of the embodiments of the invention is used for detecting and/or analyzing objects, such as e.g. pedestrians and/or traffic signs, in the vicinity of a vehicle. The vehicle may e.g. be a vehicle selected from the group comprising: a car, a van, a bus, a truck, an articulated hauler, a boat, etc. Furthermore, the method, apparatus, computer program product or computer-readable medium according to any one of the embodiments of the invention may be used for a night vision system of a vehicle.

Further embodiments of the invention are defined in the dependent claims.

Some embodiments of the invention allow for enhancing the dynamic level, such as e.g. reducing noise in a noisy image dataset, particularly, but not limited to image datasets with areas of low contrast such as image datasets or image dataset sequences obtained in low light level conditions or other conditions of poor visibility.

It is an advantage of some embodiments of the invention that they allow for noise reduction in an image dataset comprising low contrast areas, thus allowing for increased image resolution, flexibility, and clarity.

BRIEF DESCRIPTION OF THE DRAWINGS

Further objects, features and advantages of embodiments of the present invention will appear from the following detailed description of embodiments of the invention, reference being made to the accompanying drawings, in which.

DETAILED DESCRIPTION OF EMBODIMENTS

Several embodiments of the present invention will be described in more detail below with reference to the accompanying drawings in order for those skilled in the art to be able to carry out the invention. The invention may, however, be embodied in many different forms and should not be construed as limited to the embodiments set forth herein. Rather, these embodiments are provided so that this disclosure will be thorough and complete, and will fully convey the scope of the invention to those skilled in the art. The embodiments do not necessarily limit the invention. Furthermore, the terminology used in the detailed description of the particular embodiments illustrated in the accompanying drawings is not intended to be limiting the invention.

Embodiments of the present invention provide methods for enhancing the dynamic level, such as, e.g., reducing noise in a noisy image dataset, and/or enhancing the sharpness of object contours in an image dataset, particularly, but not limited to image datasets with areas of low contrast such as image datasets or image dataset sequences obtained in low light level conditions or other conditions of poor visibility that reduces the intensity contrast. The image dataset may, for example, be a 2D image dataset, sequences of 2D image datasets, a 3D image dataset, such as e.g. Magnetic Resonance Imaging and Computer Tomography imaging image dataset or sequences of 3D images or even higher-dimensional image datasets. The image datasets may in particular be night vision datasets.

Embodiments of the present invention provide methods for increasing sharpness in image datasets. Increasing sharpness may be performed per se, or in combination with dynamic level enhancement.

Embodiments of the present invention provide a digital image processing technique that utilizes summation (such as weighted averaging) to improve the visual quality of an image dataset, and particularly for image datasets obtained under conditions that have resulted in images comprising low contrast areas, e.g. areas suffering from poor lighting conditions or other poor visibility conditions, such as haze and fog etc. The image datasets under consideration could also be, e.g. low contrast image datasets obtained by a medical imaging systems and other imaging techniques resulting in low contrast image data. Alternatively, the low contrast image datasets may be night vision datasets.

The following description focuses on embodiments of the present invention applicable to an image dataset or a sequence of image datasets and in particular to noise reduction and/or enhancement of sharpness of an object contour in an image dataset or a sequence of image datasets comprising low contrast areas, e.g. in a night vision image dataset.

Figure 1:
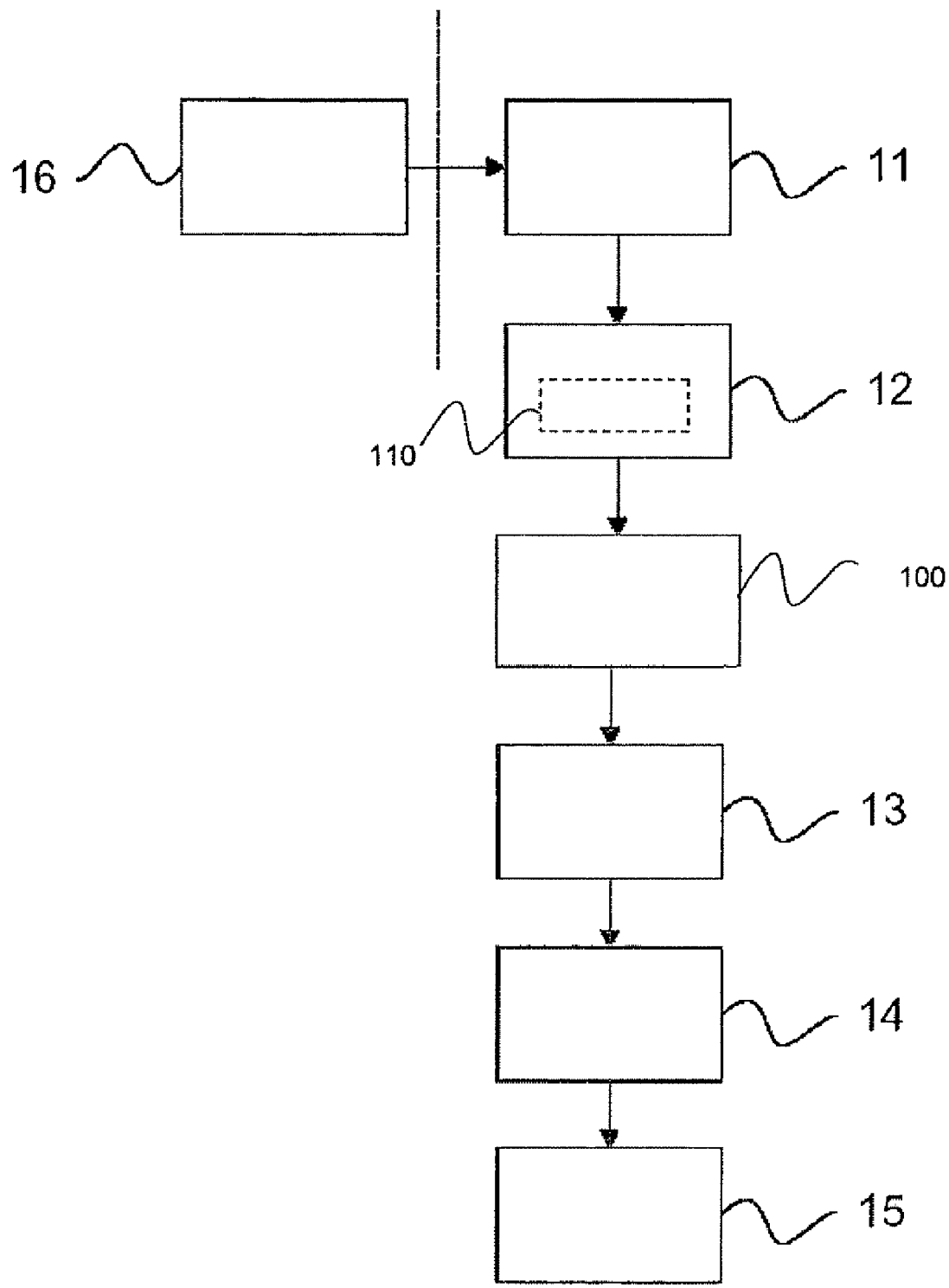
FIG. 1 is a schematic illustration of a method according to an embodiment of the present invention.

In an embodiment of the present invention, according to FIG. 1, a method for noise reduction in a sequence of low contrast, e.g. night vision, image datasets is provided, wherein each image dataset has at least two pixels, wherein each pixel has an intensity value. The method shown in FIG. 1 comprises:

the calculation 11, based on estimated intensity derivatives in each pixel of an image dataset, of a measure of an intensity structure, e.g. a structure tensor, in a neighborhood around each pixel in an image dataset comprised in the sequence of image datasets. A structure tensor or second-moment matrix is a matrix representation of partial derivative information in each pixel of in image. It is typically used to represent information about gradients or edges present in an image. Eigen-decomposition may be applied to a structure tensor matrix to form the eigenvalues and eigenvectors, respectively.

the calculation 12 of values in a summation kernel based on the measure of the intensity structure, e.g. structure tensor, for each pixel in the image dataset.

the calculation 13 of a weighted intensity value for each pixel in the image dataset, using as weights the values in the summation kernel.

the storage 14 of the weighted intensity value for each pixel in said image dataset as a processed intensity value for each corresponding pixel in a processed output image dataset.

A method according to embodiments of the present invention may furthermore comprise rotating a local co-ordinate system in which the summation kernel is described, resulting in that the co-ordinate axes of said local co-ordinate system coincide with the directions of the eigenvectors of said structure tensor, where said eigenvectors are described in the global co-ordinate system of the image dataset. The method may furthermore comprise scaling the co-ordinate axes of the local co-ordinate system in which the summation kernel is described by an amount related to the eigenvalues of the structure tensor via a width function $w(\lambda_i)=\sigma_i$, the width function being a decreasing function such that $w(0)=\sigma_{max}$ and $\lim_{a\to\infty} w(a)=\sigma_{min}$, and wherein said eigenvalues depend on the amount of intensity variation in the direction of their corresponding eigenvectors. For calculating the width $\sigma_i$ of the summation kernel in the direction of eigenvector $e_i$, i.e. for calculating the scaling of the axes in this direction, the width function depends on the eigenvalue $\lambda_i$ that corresponds to the eigenvector $e_i$, and preferably does not depend on the eigenvalues corresponding to the other eigenvector directions. Hence, the width function need only depend on the eigenvalue $\lambda_i$ that corresponds to the eigenvector $e_i$.

A method according to embodiments of the present invention may include the repetition of the above steps for a subsequent image dataset until all image datasets of the sequence of image datasets have been processed.

Image Dataset Type

In an embodiment of the present invention, said image dataset comprises a single 2D, 3D, or higher-dimensional monochrome image or a single multi-channel image, such as a single color image.

In an embodiment of the present invention, said sequence of image datasets comprises 2D, 3D, or higher-dimensional monochrome image datasets or multi-channel image datasets, such as color image datasets.

An example of a multi-channel color image dataset is an RGB image dataset comprising three channels, e.g. one channel for red, one channel for green and one channel for blue. The special considerations that have to be taken when dealing with color images and other multi-channel image datasets are referred to below.

In an embodiment of the present invention, the image dataset or sequence of image datasets is generated by a video camera, a still image camera, or other imaging devices for the purpose of e.g. medical imaging, surveillance, industrial inspection, industrial and scientific measurements, and image-based navigation of different kinds of vehicles. The above mentioned imaging devices comprise in addition to video cameras and still image cameras for example microscopic 2D or 3D imaging devices such as fluorescence microscopes, different kinds of image scanning devices, image digitizers and medical imaging devices such as Magnetic Resonance Imaging systems, Computed Tomography systems or Ultrasound systems. The image datasets considered could also have been obtained using any kind of multi-spectral, image forming, measuring technique.

In embodiments of the present invention, the image datasets or sequences of image datasets are night vision image datasets or sequences of night vision image datasets. The imaging devices for obtaining such night vision image datasets may be night vision cameras or night vision systems of a vehicle or a robot, for example.

In an embodiment of the present invention, the image dataset or sequence of datasets is generated by a system constructing a distance image of a scene, where the intensity in each pixel in the said distance image relates to the distance to an object in the corresponding direction in the scene. This system could for example be comprised of a 3D camera or a set of multiple cameras.

Structure Tensor

In an embodiment of the present invention, the intensity structure depends on the first image dataset and/or preceding image datasets and/or subsequent image datasets of the sequence of image datasets.

In an embodiment of the present invention, the calculation of a measure of the intensity structure comprises calculating a structure tensor J in each pixel, based on measures of the rate of intensity variation along the different axes in the spatiotemporal space in the current pixel. These measures may, e.g., be based on estimation of intensity derivatives in each pixel and/or more generally based on weighted intensity values.

The structure tensor J may be used to analyze the local intensity structure in the neighborhood of each pixel and may be calculated using image intensity derivatives. An example of the structure tensor is given in Eqn. 1. The dimensions in this example relate to an image dataset sequence of 2D image datasets where x and y represent the spatial dimensions and t represents the temporal dimension The image data is accordingly treated as 3D intensity data. The structure tensor, J, in the point (x, y, t) in the 3D intensity data may then generally be calculated according to Eqn. 1

$$J(x, y, t) = M(\nabla I(x, y, t)^T \nabla I(x, y, t)) \quad (1)$$

$$= M\left(\begin{bmatrix} \frac{\partial I}{\partial x} \\ \frac{\partial I}{\partial y} \\ \frac{\partial I}{\partial t} \end{bmatrix} \begin{bmatrix} \frac{\partial I}{\partial x} & \frac{\partial I}{\partial y} & \frac{\partial I}{\partial t} \end{bmatrix}\right)$$

wherein $$\frac{\partial I}{\partial x}$$

denote the measure of the rate of intensity variation (intensity derivative estimation) along the x axis and respectively for the other axes, and wherein M denotes calculating, for each element in the matrix $\nabla I^T \nabla I$, a weighted intensity value (e.g. mean value) in a neighborhood around the currently processed pixel in the spatial, or in this case, spatiotemporal space. This weighted intensity value may be implemented by element-wise convolution with a bell-shaped function, e.g. Gaussian kernel. The weighting kernel may be isotropic, i.e. of equal width in relation to all axes, and symmetric around each axis, i.e. if W is a discrete function representing the weighting kernel in 3D, W(x,y,t)=W(−x,y,t), and respectively for the other axes. The weighted intensity value averages the gradient data $\nabla I$ around each pixel $\overline{x}$ in the processed image dataset. The resulting structure tensor J is a matrix whose eigenvector, corresponding to the largest eigenvalue, points approximately in the gradient direction and the other two eigenvectors are orthogonal to this vector. From eqn. 1 it may be observed that the structure tensor is constructed from the image intensity derivatives in the directions of the axes of the different dimensions in the currently processed image dataset.

Before or during the calculation of the intensity derivatives, the image dataset may be low-pass filtered or smoothed, e.g. by convolving the image dataset with a symmetric isotropic bell-shaped, e.g. Gaussian, kernel. Thus, high frequency content in the image dataset may be reduced or even removed. The low-pass filtering may thus be used to make the derivative estimations less sensitive to high frequency noise in the image dataset.

Input parameters for the structure tensor calculation may be the maximum size of the neighborhood N used for the calculations of the measures of the rate of intensity variation and for the low-pass filtering in order to reduce or remove the high frequency noise. The maximum size of N may be set by parameters describing the extent of the neighborhood in the spatial, or spatial and temporal, dimensions. One parameter may be the maximum extent in the spatial dimensions, $n_s$, indicating for example in a 2D image dataset a maximum spatial extent as being $n_s \times n_s$ pixels. For the temporal dimension, in the case of an image dataset sequence, the parameters might be one parameter for the number of image datasets used preceding the first image dataset in time, $n_b$, and one parameter for the number of image datasets used succeeding the first image dataset in time, $n_f$. These parameters may be set as global parameters.

If the image dataset is a multi-channel image dataset, for example a color dataset comprising different color channels, there are different options on how to calculate the measure of the intensity structure. Hereinbelow, four different options are explained.

In an embodiment of the present invention, wherein said image dataset is a multi-channel image dataset, the calculation 11 comprises calculating a separate structure tensor $J_i(\bar{x})$ for each pixel $\bar{x}$ and each channel i following the procedure above and keeping all structure tensors for forthcoming stages in the processing. This means that for an RGB image dataset there will be one structure tensor for each of the R, G, and B channel and that each channel is treated as a separate monochromatic image dataset, similar to the procedure for monochromatic sequences according to embodiments of the present invention.

In another embodiment of the present invention, wherein said image dataset is a multi-channel image dataset, the calculation 11 comprises calculating a separate structure tensor $J_i(\bar{x})$ for each pixel $\bar{x}$ and each channel i and then averaging the corresponding structure tensor elements over the different channels into one structure tensor $J(\bar{x})$ for pixel $\bar{x}$. This structure tensor will then represent all channels at the current pixel in the following stages of the method according to some embodiments of the present invention. This means that for a RGB image dataset there will be one single structure tensor for the R, G, and B channels to be used in the following stages.

In an embodiment of the present invention, wherein the image dataset is a multi-channel image dataset, the calculation 11 comprises calculating a mean value for the respective measures of the rate of intensity variation (intensity derivative estimations) over the different channels and based on these mean values calculating a single structure tensor $J(\bar{x})$ to be used in the current pixel $\bar{x}$ in the following stages.

In an embodiment of the present invention, wherein the image dataset is a multi-channel image dataset, the calculation 11 comprises calculating a mean value for the intensity value in R, G and B channels and to calculate measures of the rate of intensity variation based on this mean intensity value. These measures of the rate of intensity variation are then used to calculate a single structure tensor $J(\bar{x})$ to be used in the current pixel $\bar{x}$ in the following stages.

Summation Kernel

The calculation 12 of the summation kernel may comprise calculating the eigenvectors and eigenvalues of the structure tensor for the currently processed pixel $\bar{x}$ and subsequently calculating a summation function S based on said eigenvalues and eigenvectors. The summation function is then discretized, forming a finite block of pixels called the summation kernel $\bar{S}$. Using said eigenvalues and eigenvectors for the calculation of the summation function gives a flexible method where the influence of the intensity levels and the magnitudes of the intensity gradients on the shape of the summation function may be adapted to the current image dataset or to different local areas in the current image dataset.

In an embodiment of the present invention, the calculation 12 results in rotating the local coordinate system in which the summation kernel is described so that the coordinate axes of said coordinate system coincides with the directions of the eigenvectors of the structure tensor, where said eigenvectors are described in the global coordinate system of the image dataset. Further, the width of the summation function along the directions of said eigenvectors depends on the corresponding eigenvalues via a function called the width function. The magnitude of the eigenvalues corresponds to the amount of intensity variation in the direction of the corresponding eigenvectors. The summation function in this way adapts itself to the intensity structure in the neighborhood around the each pixel currently being processed.

In another embodiment of the present invention, the calculation 12 comprises diagonalizing the structure tensor in the currently processed pixel x according to the following equation, known in the field of mathematics and image processing, $$J = RLR^T \qquad (2)$$

where R is an orthogonal rotation matrix that has the normalized eigenvectors of J as column vectors. The matrix L is a diagonal matrix that has the corresponding eigenvalues of J as diagonal elements. As an example in 3D, $$L = \begin{bmatrix} \lambda_1 & 0 & 0 \\ 0 & \lambda_2 & 0 \\ 0 & 0 & \lambda_3 \end{bmatrix} \qquad (3)$$

where $\lambda_1$ is the eigenvalue corresponding to the eigenvector in this first column of R etc.

The calculation 12 also comprises calculating the widths $\sigma_i$ of the summation function in the directions of the corresponding eigenvectors using the eigenvalues $\lambda_i$. This calculation is managed by the width function $w(\lambda_i) = \sigma_i$. The width function w is a decreasing function such that $w(0) = \sigma_{max}$ and $\lim_{a \to \infty} w(a) = \sigma_{min}$.

In particular embodiments of the present invention, the width function w may be defined as an exponential function which depends directly on the eigenvalue $\lambda_i$ in the current eigenvector direction $e_i$, for example in the following way:

$$w(\lambda_i, x_0) = \begin{cases} \Delta\sigma e^{-\frac{\lambda_i}{d(x_0)} + \frac{1}{2}} + \sigma_{min}, & \lambda_i > \frac{d(x_0)}{2} \\ \sigma_{max}, & \lambda_i \leq \frac{d(x_0)}{2} \end{cases}$$

where $\Delta\sigma = (\sigma_{max} - \sigma_{min})$, so that $w(\lambda_i) = \sigma_i$ attains its maximum $\sigma_{max}$ below $$\lambda = \frac{d}{2}$$

and asymptotically approaches its minimum $\sigma_{min}$ when $\lambda \to \infty$. The quantity $d(x_0)$ is introduced which is a measure of the variance of the noise in the point $x_0$, as explained below.

Since structure tensor J is a positive semi-definite matrix, all $\lambda_i \geq 0$ and the preset constants $\sigma_{max} > \sigma_{min} \geq 0$ consequently correspond to the maximum and minimum widths of the kernel.

When the widths $w(\lambda_i, x_0)$ have been calculated, a summation function may subsequently be constructed for every point $x_0$ according to eqn. 4:

$$S(x) = e^{-\frac{1}{2}(x-x_0)^T R \Sigma^2 R^T (x-x_0)} \quad (4)$$

The basic form of the summation function S that is constructed at each point $x_0$ is that of a bell-shaped function, e.g. a Gaussian function, including a rotation matrix R and a scaling matrix $\Sigma$. The rotation matrix is constructed from the eigenvectors $e_i$ of structure tensor J:

$R = [e_1 e_2 e_3]$ while the scaling matrix has the following form:

$$\Sigma = \begin{bmatrix} \frac{1}{\sigma_1} & 0 & 0 \\ 0 & \frac{1}{\sigma_2} & 0 \\ 0 & 0 & \frac{1}{\sigma_3} \end{bmatrix}.$$

After discretizing the summation function, the resulting summation kernel may be applied to an original image $f_{in}$ at each spatiotemporal point $x_0$ so as to calculate the output intensity $f_{out}$ of the smoothing stage in the current pixel $x_0$.

Figure 2:
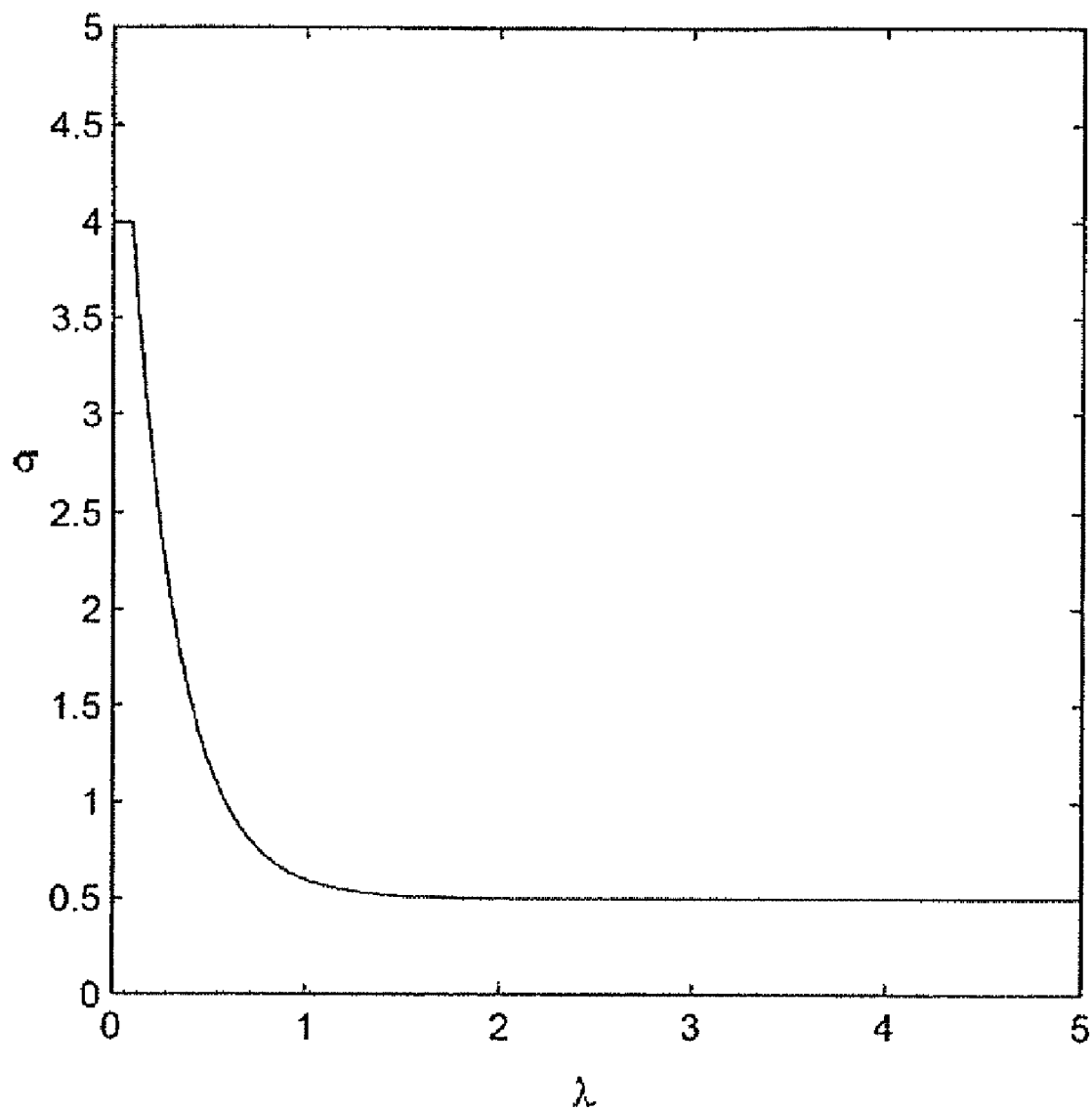
FIG. 2 is an illustration of the appearance of a typical width function according to embodiments of the present invention.

FIG. 2 illustrates the appearance of a width function. This choice of the width function gives a large width of the summation function in the direction of an eigenvector corresponding to a small eigenvalue, i.e. in directions with small intensity variation, and a small width in the direction of an eigenvector corresponding to a large eigenvalue and consequently large intensity variation.

Moreover, the calculation 12 may comprise constructing the summation function S for the current point using an auxiliary function G with the following characteristics. The characteristics are presented in the case of 2D, for higher dimensions the analogous characteristics should be considered.

1) G should attain its maximum value in the origin, i.e. $G(0, 0) \geq G(x, y)$ for all x and y.

2) G should be a decreasing function in all directions, i.e. $G(x_2, y) \geq G(x_1, y)$ if $|x_2| > |x_1|$ and $G(x, y_2) \geq G(x, y_1)$ if $|y_2| > |y_1|$.

3) G should be isotropic in relation to the coordinate axes, i.e. $G(x, y) = G(y, x)$ for all x and y.

4) G should be symmetric in relation to each coordinate axis, i.e. $G(x, y) = G(-x, y)$ and $G(x, y) = G(x, -y)$ for all x and y.

The auxiliary function G could for example be a bell-shaped function, such as for example the Gaussian function $$G(x, y) = e^{-\frac{1}{2}(x^2 + y^2)} \quad (5)$$

The calculation 12 may further comprise scaling and/or rotating the local coordinates $\hat{x}$, corresponding to a local coordinate system in the neighborhood N centered on the currently processed pixel $\bar{x}$. This is accomplished using the matrix R and a width matrix $\Sigma$. Let, in the case of three dimensions, $$\Sigma = \begin{bmatrix} \frac{1}{\sigma_1} & 0 & 0 \\ 0 & \frac{1}{\sigma_2} & 0 \\ 0 & 0 & \frac{1}{\sigma_3} \end{bmatrix}$$

wherein $w(\lambda_i) = \sigma_i$ are the widths calculated from the eigenvalues $\lambda_i$ using the width function w. The summation function S is then constructed from G in the following way $S(\hat{x}) = G(\Sigma R^T \hat{x})$ In the case of a Gaussian function in a 3D setting, the resulting summation function will be $$S(x, y, t) = e^{-\frac{1}{2}(R^T \hat{x})^T \begin{bmatrix} \frac{1}{\sigma_1^2} & 0 & 0 \\ 0 & \frac{1}{\sigma_2^2} & 0 \\ 0 & 0 & \frac{1}{\sigma_3^2} \end{bmatrix} (R^T \hat{x})} \quad (6)$$

In an embodiment of the present invention, the calculation 12 further comprises discretizing the first summation function S so that it constitutes a finite 2D, 3D or 4D block according to the dimension of the currently processed image dataset, with boundaries defined by the numbers $n_s$, $n_b$ and $n_f$, wherein $n_s$ is a predetermined maximal number of pixels along each spatial dimension, $n_b$ is a predetermined maximal number of preceding image datasets, and $n_f$ is a predetermined maximal number of subsequent image datasets comprised in the sequence of image datasets. The block of pixels may be referred to as a summation kernel $\overline{S}$ hereinafter.

The calculation 12 may moreover comprise normalizing the values of the summation kernel so that the total sum of all pixel values within the summation kernel is 1.

Through the rotation and scaling described above, the summation function S may be adjusted according to the intensity variation in the image dataset and, hence, the summation function may be automatically elongated along intensity streaks in the spatiotemporal space that corresponds to motion trajectories in an image sequence. Thus, this method does not utilize an explicit motion estimation to estimate motion trajectories like some prior art methods, but obtains such trajectories more or less automatically. Since the method does not distinguish between axes that represent spatial dimensions and the axis that represents a possible temporal dimension, the shape of the kernel adjusts to all intensity structures in a similar way, without considering whether it represents a motion trajectory or not.

In an embodiment of the present invention, wherein the image dataset is a multi-channel image dataset, e.g. a color image data set, the calculation 12 comprises calculating one summation kernel $\overline{S}_i$ based on each structure tensor $J_i(\bar{x})$ calculated in the calculation 11 step for each pixel $\bar{x}$.

In another embodiment of the present invention, wherein the image dataset is a multi-channel image dataset, e.g. a color image dataset, the calculation 12 comprises calculating the summation kernel $\overline{S}$ based on the structure tensor $J(\bar{x})$ common for all channels calculated in the calculating 11 step for each pixel $\bar{x}$.

In a further embodiment of the present invention, wherein the image dataset is a multi-channel image dataset, the calculating 12 comprises calculating a separate summation kernel for all channels, and the calculating 13 comprises summation with a separate summation kernel for all channels.

Figure 3:
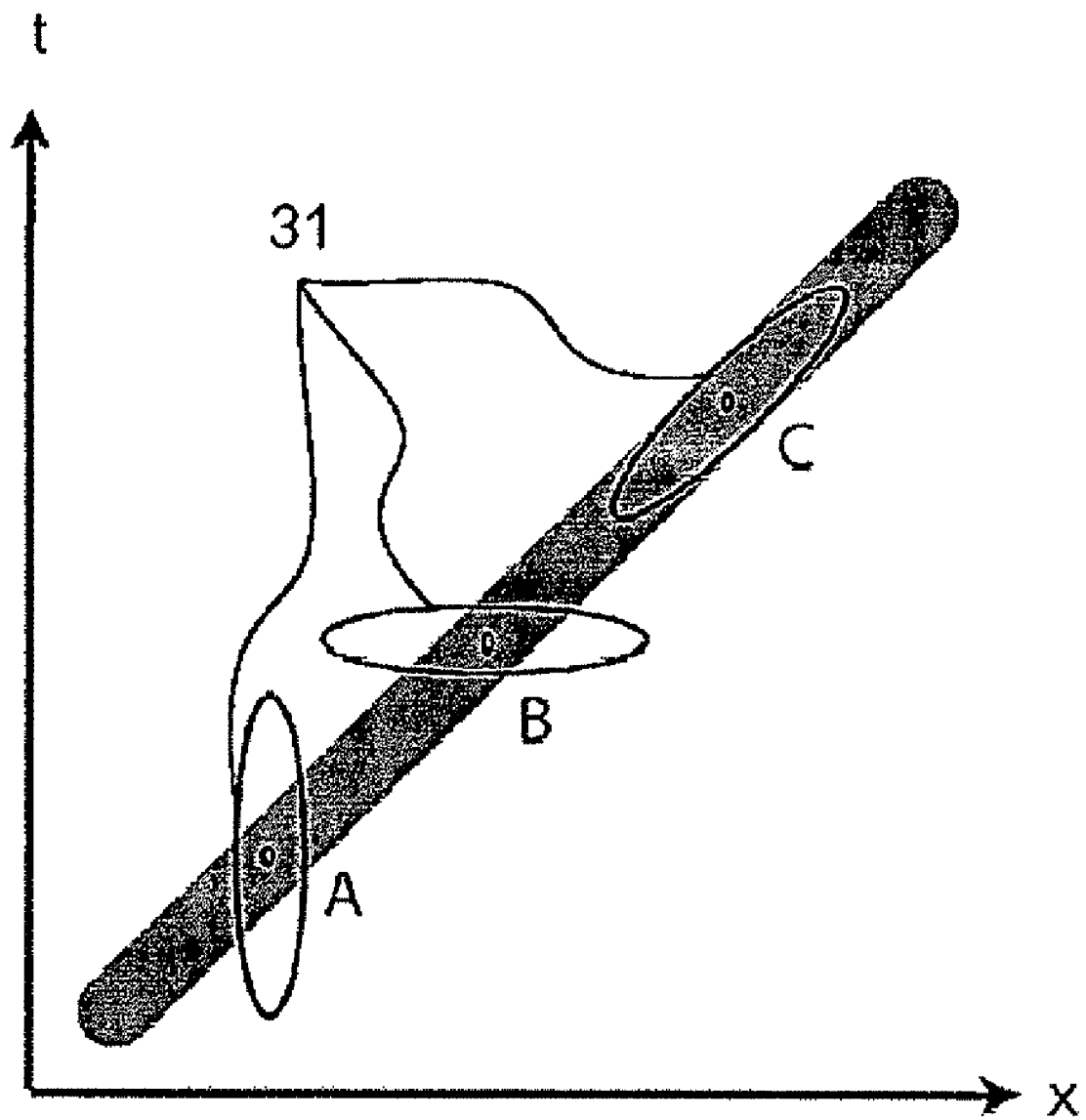
FIG. 3 is an illustration showing the spatiotemporal intensity structure of a grey object moving from left to right in an image dataset sequence according to an embodiment of the present invention.

FIG. 3 is an illustration showing the spatiotemporal intensity structure of a grey object moving from left to right in an image dataset sequence wherein t indicates a temporal dimension and x indicates a spatial axis. At point A and point B, the summation kernel 31 is elongated in the t and the x direction, respectively. At point C the summation kernel 31 is elongated along the grey intensity structure, which would be the result of the present embodiments.

It may be noted that a restriction of only being able to change the width of the neighborhood over which the summation is performed, symmetrically around the spatial and temporal axes will in general result in including intensities in the, in this case, white background of the images, which will lead to an image where contours and edges are blurred. In the present method, the summation kernel is automatically rotated and shaped as to fit the general intensity structure. In the case of an image sequence this may for example lead to a summation that is performed mainly along a direction that is adjusted to the direction of motion of a moving object. This means that the method enables applying summation using a summation kernel that is extended over a larger area while keeping the amount of blurring to a minimum in the resulting noise reduced output image dataset.

Local Adaptation Based on Local Noise—Noise Measure

The amount of noise in an image sequence changes depending on the brightness level. Since, according to embodiments of the present invention, it is desired that the algorithm adapts to changing light levels, both spatially within the same image and/or temporally in the image sequence, the above width function, in embodiments of the present invention, preferably depends on the noise level step 110 in FIG. 1. This adaptation is governed in accordance with embodiments of the present invention by the measure d. A less preferred option for the noise level is that the width function is adapted to the SNR.

First, the noise is estimated in each 2D image. This is done by subtracting a smoothed image e.g. an isotropically smoothed version of the input image from the original image. Typically, a Gaussian kernel with a suitable standard deviation, e.g. 2 is used for this operation but the invention is not limited thereto. For example any bell-shaped function can be used or any function that decreases with distance from the pixel under consideration. This provides a sequence of noise images $f_n(x)$. 2D images are used in this case since motion will give a response in the noise estimation if isotropic spatiotemporal smoothing is applied. The measure d is then a scaled estimation of the variance v of the noise $f_n$ in a spatiotemporal neighborhood $\Omega$ centered at $x_0$, e.g.:

$$d(x_0) = \rho v(x_0) = \frac{\rho}{N-1} \sum_{\Omega} (f_n(x) - \bar{f}_n(x_0))$$

where N is the number of pixels and $\bar{f}_n(x_0)$ is the mean of the noise in the neighborhood $\Omega$ centered at $x_0$. The scaling factor $\rho$ is a constant that is multiplied with the variance $v(x_0)$ so that the measure $d(x_0)$ will be of a magnitude that is suitable for insertion in the width function w. A suitable value for $\rho$ can be found that works for most image sequences. In experiments, $$\rho = \frac{1}{64}$$

has been generally used. However, hereinafter a procedure is suggested for the estimation of $\rho$.

As an alternative to working with a pre-determined fixed value for the scaling factor $\rho$, e.g.

$$\rho = \frac{1}{64},$$

a value for the scaling factor $\rho$ may be estimated from real images, e.g. on the fly, as explained hereinbelow. If the image sequence is modeled as a signal with added independent identically distributed (i.i.d.) Gaussian noise of zero mean, the following can be said about the noise in the estimated eigenvalues.

First of all the sequence is filtered with Gaussian filters as well as differentiation filters to estimate the gradients in the sequence at every point. The noise in the estimated gradients will hence also be Gaussian but with a different variance. The structure tensor is calculated from the estimated gradients. As the structure tensor is made up of the outer product of the gradients, and the tensor is then filtered elementwise, the tensor elements will be a sum of squares of Gaussian distributed variables. A sum of n squared Gaussian distributed variables, with variance v, will be Gamma distributed with mean $nv$ and variance $(nv)^2$. The noise in the filtered tensor elements will hence be Gamma distributed and so will the noise in the eigenvalues.

Figure 9:
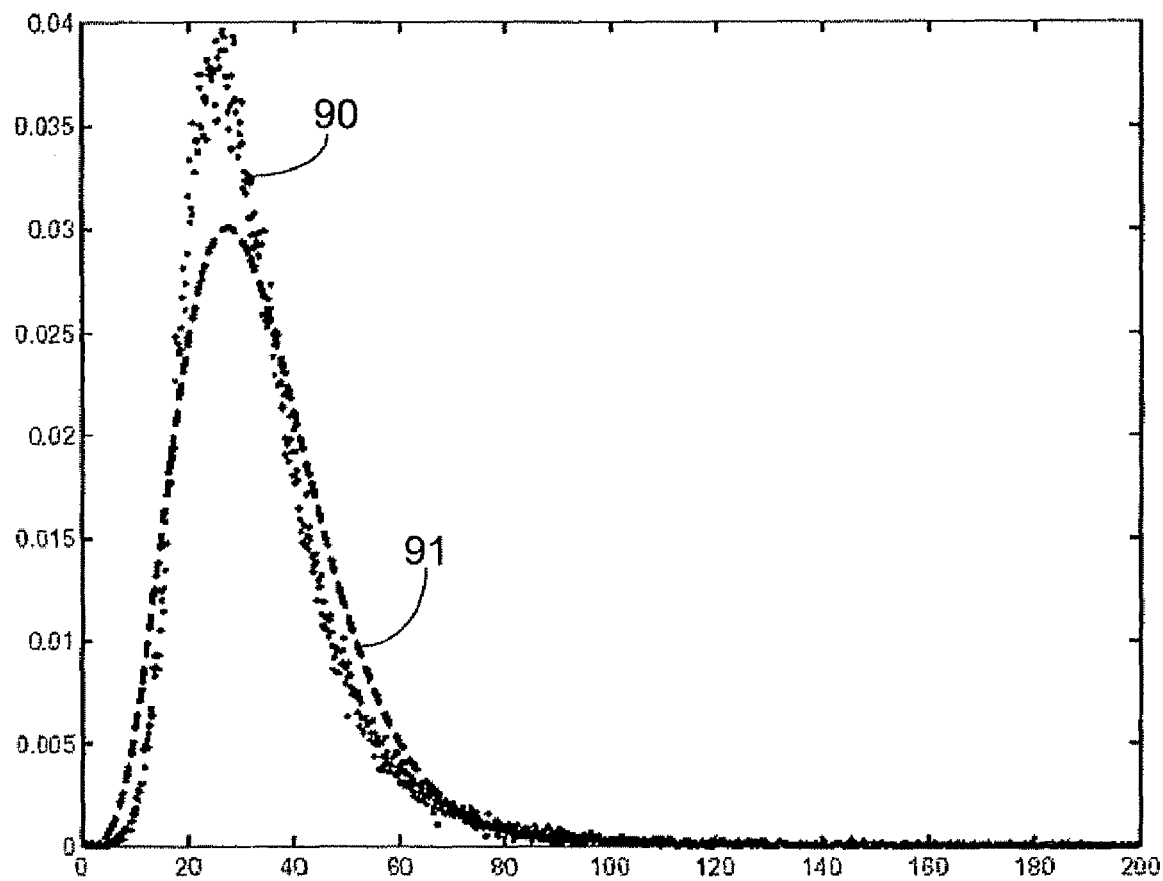
FIG. 9 illustrates an estimation of a Gamma distribution from the histogram of the second largest eigenvalues. The dots represent the eigenvalues and the dashed line the least squares fitted Gamma distribution.

In FIG. 9 a histogram of the second largest eigenvalue of the structure tensors for an image is shown in dots, curve 90. A Gamma probability density function (PDF), which depends on two independent parameters, can be fitted to such a histogram by any suitable regression, e.g. in a least squares manner. This gives us the mean $\bar{\lambda}$ and standard deviation $S_\lambda$ of the Gamma distribution. The resulting Gamma distribution is shown as the dashed line, curve 91. Experiments have shown that the histogram of the eigenvalues generally follow a Gamma distribution well. More generally a parameter function may be used to fit the histogram, whereby the parameters may be used in similar way as the mean $\bar{\lambda}$ and standard deviation $S_\lambda$ of the Gamma distribution described. From the parameter values obtained with the fit, the overall measure b then may be derived based on a correlation between the parameters and the overall measure b. The number of parameters used may be two or more.

An overall measure b of the noise level in an eigenvalue $\lambda_i$ can then be estimated as the mean plus a number n times the standard deviation, i.e. $b = \bar{\lambda} + n s_\lambda$. Any of the eigenvalues $\lambda_i$ could be used to calculate b. In the spatio-temporal case with a 3×3 structure tensors the second largest eigenvalue may often be used for the calculation of b.

An estimate of the global noise variance v in the image can be calculated as $$v = \frac{1}{N-1} \sum_{\Omega} (f_n(x) - \bar{f}_n),$$

where the summation is taken over the whole image, i.e. $\Omega$ refers to the whole image, N is the number of pixels in this image and $\bar{f}_n$ is the global mean over the whole image. The measure b is of the same magnitude in relation to the global variance v as the magnitude of the local measure $d(x_0)$ in relation to the local variance $v(x_0)$. This gives a way of calculating the scaling factor $\rho$, $\rho=b/v$ where b and v are estimated from the images.

Sharpening of Object Contours

A structure tensor is surprisingly good at finding the direction of motion in very noisy input sequences. However, in some cases the elongation of the constructed summation kernels can be slightly misaligned with the motion direction. In these cases the contours of the moving objects can be somewhat blurred. In embodiments of the present invention the addition of some high-boost filtering is proposed to sharpen up these contours. The high-boost filter H is defined as a 3×3×3 tensor with the value −1 in all elements except the center element which has the value 27A−1, as described by R. Gonzales and R. Woods in "Digital Image Processing", Addison-Wesley, 1992. The best results have been attained using A=1.2. If the filter is applied after the complete smoothing summation process, problems of negative values and rescaling of intensities will be encountered, which will give a global intensity flickering in the image sequence.

According to embodiments of the present invention, it is instead proposed that, for each point in the image, the constructed summation kernel $\overline{S}$ is filtered with a highboost filter, step 100 in FIG. 1, thus yielding a new kernel $\overline{S}_H$. This kernel is then normalized so that its coefficients add up to 1. In this way, application of the constructed kernels $\overline{S}_H$ in the summation step will add some sharpening at the most important spatial and temporal edges together with smoothing in other appropriate directions.

In another embodiment of the invention, not illustrated in the drawings, the discrete high-boost filter H can be approximated by a continuous function h, for example $$h = e^{-\frac{1}{2\sigma^2}|\hat{x}|^2}\left(1 - \frac{\alpha^2}{2}|\hat{x}|^2\right) \quad (7)$$

By using h a summation function $S_h$ with sharpening functionality can be calculated by performing the convolution between h and S analytically, $$S_h = S * h$$

Using the example function in equation (7) the summation function $S_h$ is given by $$S_h = e^{-0.5(\hat{x}_{hb} \cdot \hat{x}_{hb})}\left(1 - \frac{3\alpha^2\sigma^2}{2} - \frac{\alpha^2\sigma^4}{2}((\hat{x}_{hb2} \cdot \hat{x}_{hb2}) - (s \cdot s))\right)$$

where $$\hat{x}_{hb} = \left[\begin{array}{ccc} \frac{x_r}{\sqrt{\sigma_x^2+\sigma^2}} & \frac{y_r}{\sqrt{\sigma_y^2+\sigma^2}} & \frac{t_r}{\sqrt{\sigma_t^2+\sigma^2}} \end{array}\right],$$

$$\hat{x}_{hb2} = \left[\begin{array}{ccc} \frac{x_r}{\sigma_x^2+\sigma^2} & \frac{y_r}{\sigma_y^2+\sigma^2} & \frac{t_r}{\sigma_t^2+\sigma^2} \end{array}\right],$$

$$S = \left[\begin{array}{ccc} \frac{1}{\sqrt{\sigma_x^2+\sigma^2}} & \frac{1}{\sqrt{\sigma_y^2+\sigma^2}} & \frac{1}{\sqrt{\sigma_t^2+\sigma^2}} \end{array}\right].$$

Here $x_r$, $y_r$ and $t_r$ are the local coordinates rotated by the previously described rotation matrix R, i.e.

$$\begin{bmatrix} x_r \\ y_r \\ t_r \end{bmatrix} = R^T \begin{bmatrix} x \\ y \\ t \end{bmatrix} = R^T \hat{x}$$

where R is obtained from the eigenvectors of the structure tensor. The widths $\sigma_x$, $\sigma_y$, and $\sigma_t$ are calculated as usual using the width function w and the eigenvalues of the structure tensor. The parameters $\sigma$ and $\rho$ are inherited from the function h. The general form of the summation function $S_h$ is used globally and the parameters $\sigma$ and $\rho$ are also set globally.

Other summation functions $S_h$ can similarly be constructed using other choices of h which approximates a discrete sharpening filter. After obtaining $S_h$, the function is normalized and discretized before performing the filtering summation, giving the discrete summation kernel $\overline{S}_h$.

Summation

In an embodiment of the present invention, the calculation 13 comprises calculating a weighted intensity value of the intensities in a neighborhood N of each pixel in the currently processed image dataset by using:

$$O(\overline{x}) = \sum_{\hat{x} \in N} \overline{S}(\hat{x}) I(\overline{x} + \hat{x}) \quad (8)$$

wherein $O(\overline{x})$ defines the intensity in pixel $\overline{x}$ in the first noise reduced output image dataset, $\overline{S}$ is the summation kernel calculated for pixel $\overline{x}$ in the calculating 12 step and I is the input image. In embodiments including sharpening, e.g. as illustrated by step 100, the summation kernel $\overline{S}$ can be replaced by $\overline{S}_H$ or $\overline{S}_h$. The coordinate $\hat{x}$ refers to a local coordinate system in the neighborhood N. This step of calculating the weighted average is hereinafter also referred to as summation. The size of the neighborhood N used in the summation is determined by the parameters $n_s$, $n_f$ and $n_b$ defined above.

In an embodiment of the present invention, wherein the image dataset is a multi-channel image dataset, e.g. an RGB color image data set, and the calculation 12 comprises the calculation of one summation kernel $\overline{S}_i$ for each channel i, e.g. one for each of the R, G and B channels, then the weighted intensity value may be calculated by using:

$$O_i(\overline{x}) = \sum_{\hat{x} \in N} \overline{S}_i(\hat{x}) I_i(\overline{x} + \hat{x}) \quad (9)$$

wherein $I_i$ represents the image dataset in channel i in the first multi-channel input image dataset I and $O_i$ represents the corresponding channel in the first noise reduced multi-channel output image dataset O.

In an embodiment of the present invention, wherein the image dataset is a multi-channel image dataset, e.g. an RGB color image data set, and the calculation 12 comprises the calculation of one common summation kernel $\overline{S}$ for all channels i in the first multi-channel input image dataset I, then the weighted intensity value may be calculated by using $$O_i(\overline{x}) = \sum_{\hat{x} \in N} \overline{S}(\hat{x}) I_i(\overline{x} + \hat{x}) \quad (10)$$

Rendering

In an embodiment of the present invention, the method further comprises rendering 15 of the created output image dataset for presentation on a display.

The rendering 15 may comprise transmitting each pixel in each first noise reduced output image dataset to an output unit, such as a display for presentation.

Storing

In an embodiment of the present invention, the storing 14 comprises storing each first noise reduced output image dataset on a storage device. Optionally, each first noise reduced output image dataset may be stored on a storage device, such as a hard drive.

Image Stabilization

In some cases the currently processed image dataset may comprise motion disturbances. This may be the case for an image dataset when the obtaining unit, such as a video camera, obtaining the image dataset is shaking or vibrating while obtaining the consecutive image datasets. In these cases, the image dataset may be processed so that the influence of this disturbance is reduced to a minimum. A commonly known technique of reducing this motion disturbance is image stabilization, which is implemented in many commercial cameras. Image processing techniques for image stabilization by comparing consecutive images is known in the field and may be implemented by a person ordinary skilled in the art.

In an embodiment of the present invention, wherein the currently processed image dataset comprises motion disturbances, the method further comprises performing image stabilization, step 16 in FIG. 1. The order in which the step of performing image stabilization step and the intensity transformation step (see hereinbelow) are performed may be changed.

Intensity Transformation

In some cases, the currently processed image dataset, two or more of the image datasets of the sequence of image datasets, or the entire sequence of image datasets comprise low contrast areas, in particular e.g. in night vision image datasets. This may, e.g., be the result of obtaining the image datasets in low light level conditions, or more generally low contrast conditions. In these cases, the intensities may be transformed using an intensity transformation. The term intensity transformation is known to a person of ordinary skill in the art.

Performing an intensity transformation on an image dataset having low contrast areas generally results in increasing the dynamic range of the intensities in the low contrast areas in the image dataset. For example, in image datasets containing very dark areas, e.g. areas having a very low mean intensity, the intensities may be amplified heavily, while in brighter areas having a higher mean intensity the amplification may be significantly smaller. After the intensity transformation, the image dataset will in general have higher contrast and the depicted structures will be more visible. However, because of high uncertainty in the true intensity values when the image dataset is obtained under poor visibility conditions (e.g. low light level conditions such as night vision conditions) the image data may contain large amounts of noise. This noise may be amplified during the intensity transformation, resulting in the noise being even more visible and disturbing in the image dataset.

Figure 4:
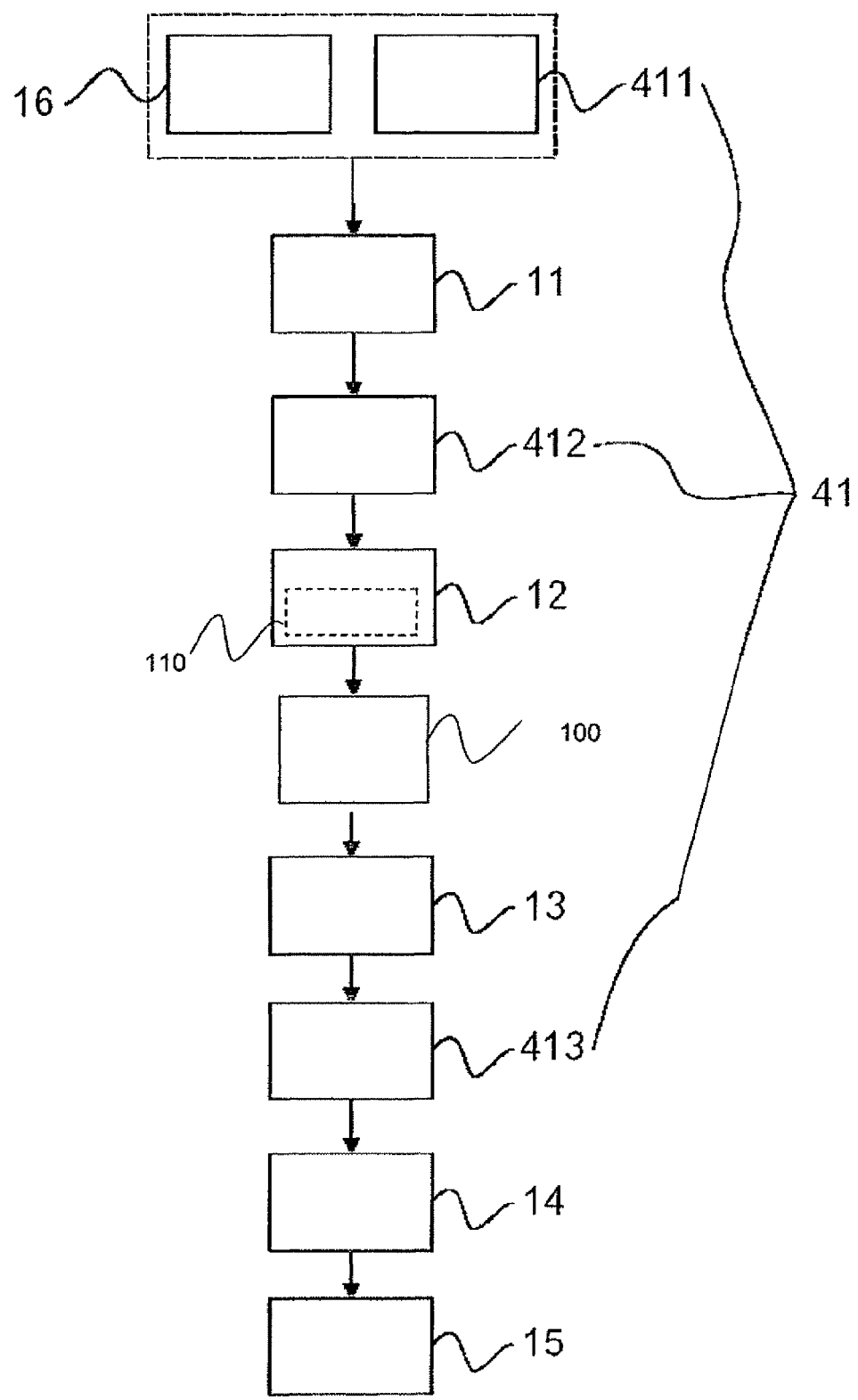
FIG. 4 is a schematic view of a method according to an embodiment of the present invention.

In an embodiment of the present invention, according to FIG. 4, the method further comprises:
transformation 41 (411, 412, 413) of the intensities in the image dataset.

The calculating 13 step of the method in general reduces the noise in the image dataset, either after the intensity transformation, according to the transforming 411 step and the transforming 412 step, or before the intensity transformation, according to the transforming 413 step.

The transformation 41 is either performed before calculating 11 step, calculating 12 step and calculating 13 step, as indicated by 411 in FIG. 4, after calculating 11 step but before the calculating 12 step and calculating 13 step, as indicated by 412 in FIG. 4, or after calculating 11, calculating 12 step and calculating 13 step, as indicated by 413 in FIG. 4.

The decision of when to perform the intensity transformation might affect the calculating 12 step of the summation kernel. For example, performing the structure tensor calculation in the calculating 11 step before the transforming 41 step, as indicated by 412 and 413 in FIG. 4, results in the eigenvalues of the structure tensor generally being much smaller than if the transforming 41 step is performed before the calculating 11 step of the structure tensor, as indicated by 411 in FIG. 4. If the same structures in the image dataset should give the same widths of the summation function in the two cases, it might be necessary to change the steepness of the decrease of the width function w, used in the calculating 12 step. This change of the width function w can be performed automatically using a technique as described in the section LOCAL ADAPTATION BASED ON LOCAL NOISE—NOISE MEASURE, step 110 in FIG. 1.

As explained above, the intensity transforming 41 step of the method may transform the original intensity values of the image dataset to new intensity values, so that the contrast is increased in areas with low intensity contrast and a small dynamic range.

Figure 5:
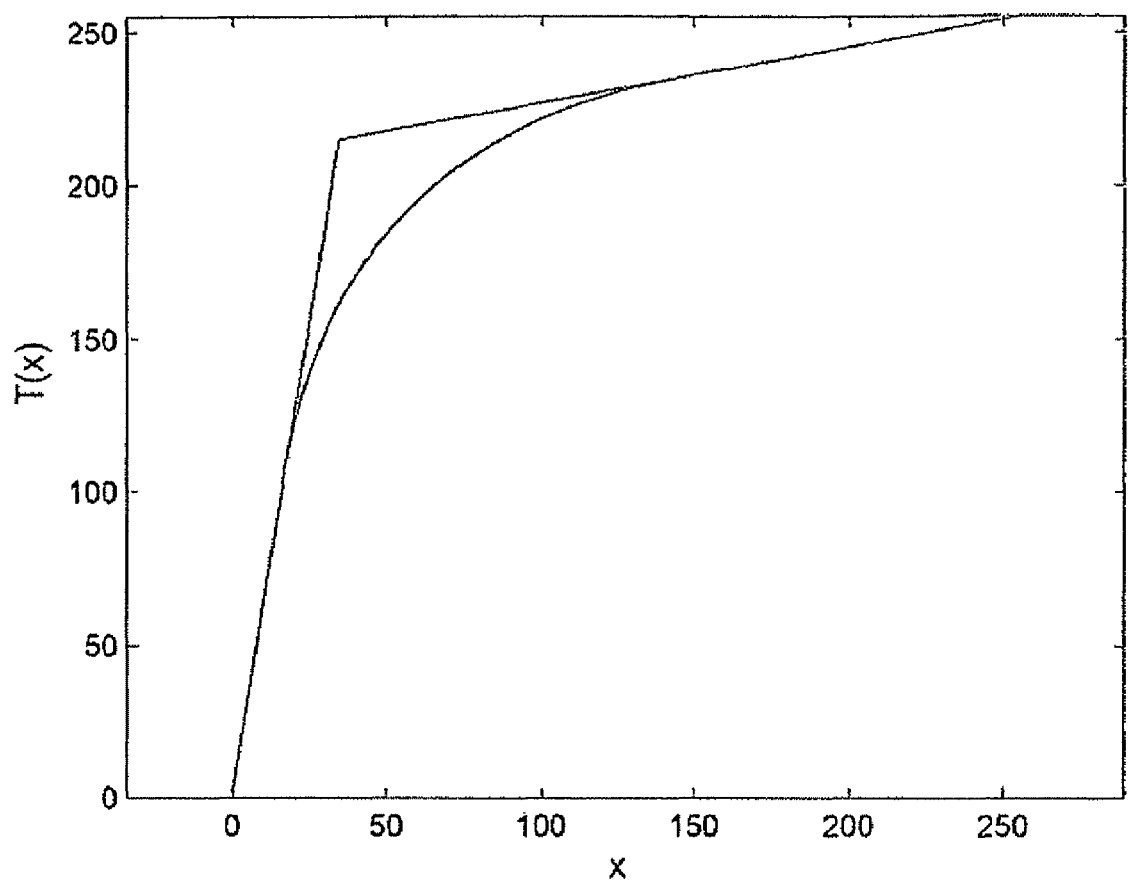
FIG. 5 is an illustration showing an increasing intensity transformation function according to an embodiment of the present invention.

In an embodiment of the present invention the intensity transforming 41 step comprises utilizing an increasing function T such that $I_T(\bar{x})=T(I(\bar{x}))$, where $I_T$ is the transformed image dataset and I is the original image dataset. The function T may be constructed such that the range of intensities constituting the dark areas, or, generally, the low contrast areas, is being mapped to a wider dynamic range in the resulting image dataset. An example of a transformation function T is illustrated as the smooth curve in FIG. 5. A way of constructing such an intensity transformation function T is by using histogram equalization, which is a commonly known technique within the field of image analysis. The construction of the function T used for the intensity transforming 41 step of the currently processed image dataset is in some embodiments of the invention either performed using only the currently processed image dataset or, in the case of an image dataset sequence, performed using the currently processed image dataset together with a number of preceding (max $n_b$) and succeeding (max $n_f$) image datasets. In some embodiments of the present invention, the image dataset may be divided into small tiles where the intensity transformation is performed locally within each tile. These tiles will generally have the same number of dimensions as the complete image dataset, i.e. for an image dataset sequence comprising 2D image datasets the tiles may be three-dimensional and include, apart from the currently processed image dataset also preceding (max $n_b$) and succeeding (max $n_f$) image datasets. This type of contrast enhancing intensity transformations and histogram equalization are known techniques and may be implemented by a skilled person within the field of image analysis.

Different techniques for intensity transformation and histogram equalization on multi-channel image datasets, such as RGB image datasets, has been previously proposed and may be applied at the intensity transforming step 41 of the method according to an embodiment of the present invention. One suitable technique for intensity transformation on a RGB image dataset comprises transforming the image dataset to a representation where one of the channels represent the intensity of the color, such as the HSV (Hue, Saturation and Value) representation where the V (value) channel represents the intensity, and then apply the intensity transformation on this channel of the image data and leave the other channels unaffected.

In an embodiment of the present invention the method further comprises performing an intensity transformation on an image dataset by an intensity transformation function to increase the intensity values of at least a part of the image dataset.

Optical Flow

In the case of image dataset sequences obtained by a video camera that is moving, e.g. a night vision camera, all the pixels in the image dataset sequence are in general occupied by moving structures. In this case the calculation 11 comprises calculating a measure of the intensity structure by, for each pixel in the image dataset, finding a vector, commonly called a motion vector, that connects the current pixel with the pixel in the succeeding image that corresponds most accurately to the same object point in the depicted scene as the current pixel. This can for example by done using optical flow estimations resulting in an optical flow field. However, there are other methods for calculating the above mentioned vectors, all of which may be implemented by embodiments of the present invention. In the following, it should be appreciated that some form of optical flow estimation is applied. The calculation 12 then comprises calculating a summation function based on the optical flow field.

The terms optical flow field and optical flow estimation are known for a person ordinary skilled in the art. Any method for calculating the optical flow may be implemented by embodiment of the present invention. Such methods may include, but is not limited to, applying image derivative approximations which are used together with the so-called optical flow constraint equation or so-called block matching methods. Block matching methods generally identify the area in the succeeding image dataset that best matches the neighborhood around the currently processed pixel in the currently processed first image dataset. The vector connecting the currently processed pixel and the central pixel of the area with the best match is defined as the optical flow vector for the currently processed pixel.

In an embodiment of the present invention, the calculation 11 comprises calculating optical flow vectors for each point $\bar{x}$ in the currently processed image dataset.

Since the image sequence may be very noisy the high frequency content of the currently processed image may be reduced before or during the optical flow estimation, e.g. low-pass filtering or smoothing may be applied. This can, for example, be performed by convolution with an isotropic symmetric Gaussian kernel of the proper number of dimensions (3D Gaussian kernel for a 2D image sequence). Generally, a standard deviation in the range of 1 and 2 pixels will be suitable for the Gaussian kernel in this processing step.

In this embodiment, the calculating 12 comprises
constructing an auxiliary function G according to the characteristics of the function G as explained hereinabove;
constructing a rotation matrix R. The rotation matrix may be constructed in the following way. In the case of a 2D optical flow vector in pixel $\bar{x}$ being obtained from calculation (11), the vector is first extended to 3D by interpreting the time difference between the currently processed image and the succeeding image as one pixel step along the temporal axis. This vector, after normalization to length 1, is then used as the first column vector in the matrix R. The other two column vectors are then chosen as a pair of orthogonal vectors of length 1 that are orthogonal to the first column vector. The vectors should be chosen such that the three column vectors relative orientation matches the relative orientation of the axes in the spatiotemporal space in which the coordinates of the image dataset is represented.

Furthermore, in this embodiment the calculation 12 further comprises
constructing a width matrix $\Sigma$ such that $$\Sigma = \begin{bmatrix} \frac{1}{\sigma_{max}} & 0 & 0 \\ 0 & \frac{1}{\sigma_{min}} & 0 \\ 0 & 0 & \frac{1}{\sigma_{min}} \end{bmatrix}$$

where the parameters $\sigma_{max} > \sigma_{min} \geq 0$ are preset constants corresponding to the maximum and minimum widths of the kernel,
constructing a summation function S for each pixel $\bar{x}$ in the currently processed image dataset using $$S(\hat{x}) = G(\Sigma R^T \hat{x})$$

wherein $\hat{x}$ are the coordinates of a point in a local coordinate system in a neighborhood N, centered on the currently processed pixel $\bar{x}$; and
calculating the discrete summation kernel $\overline{S}$ by discretizing the summation function S so that it constitutes a 2D, 3D or 4D block according to the dimension of the currently processed image dataset, with boundaries defined by the numbers $n_s$, $n_b$ and $n_f$, wherein $n_s$ is a predetermined maximum number of pixels along each spatial dimension, $n_b$ is a predetermined maximum number of preceding image datasets, and $n_f$ is a predetermined maximum number of subsequent image datasets comprised in the sequence of image datasets.

In an embodiment of the present invention the motion of the camera is a pure translational motion or an almost pure translational motion. In this embodiment the optical flow method is modified so that the output flow field is constrained to being a translational flow field, e.g. an optical flow field that is the result of a translational motion. An extra option is to also preset the length of the flow vectors (motion vectors). Following this, only two parameters for the complete flow field in the image dataset, the so-called focus of expansion, needs to be calculated. The focus of expansion is a pixel in the image dataset plane that corresponds to the projection of the direction of translation of the camera onto the image plane. If data regarding the speed by which the camera is moving, a model of the camera (a model of how the object points are projected onto the image plane), and a reasonable approximation of the depth of the scene in the different parts of the image plane is available, a useful pre-estimation of the length of the flow vectors may be performed. If data regarding the translation direction of the camera is available this information may additionally be used to calculate an improved estimation of the translational flow field.

In another embodiment of the present invention the camera is being mounted in a car and the car is being equipped with a computer, e.g. an onboard computer, with capability to store the speed and driving direction of the car. In this embodiment the speed data for the estimation of the length of the optical flow vectors, according to the last paragraph, may be obtained from the computer. The speed and the driving direction data, together with a camera model and a depth estimation, may optionally also be used directly to estimate a reasonable complete (or almost complete) flow field, with or without constraints on being a translational flow field.

In an embodiment of the present invention, the calculation 11 of a measure of the intensity structure further comprises calculating the optical flow vectors (motion vectors) for each pixel of each image dataset of the sequence of image datasets.

Foreground Background Segmentation

In the case when the image dataset sequence to be processed is obtained by a static video camera, e.g. a video camera that does not move between obtaining consecutive image datasets, an optional procedure for processing is provided.

Figure 6:
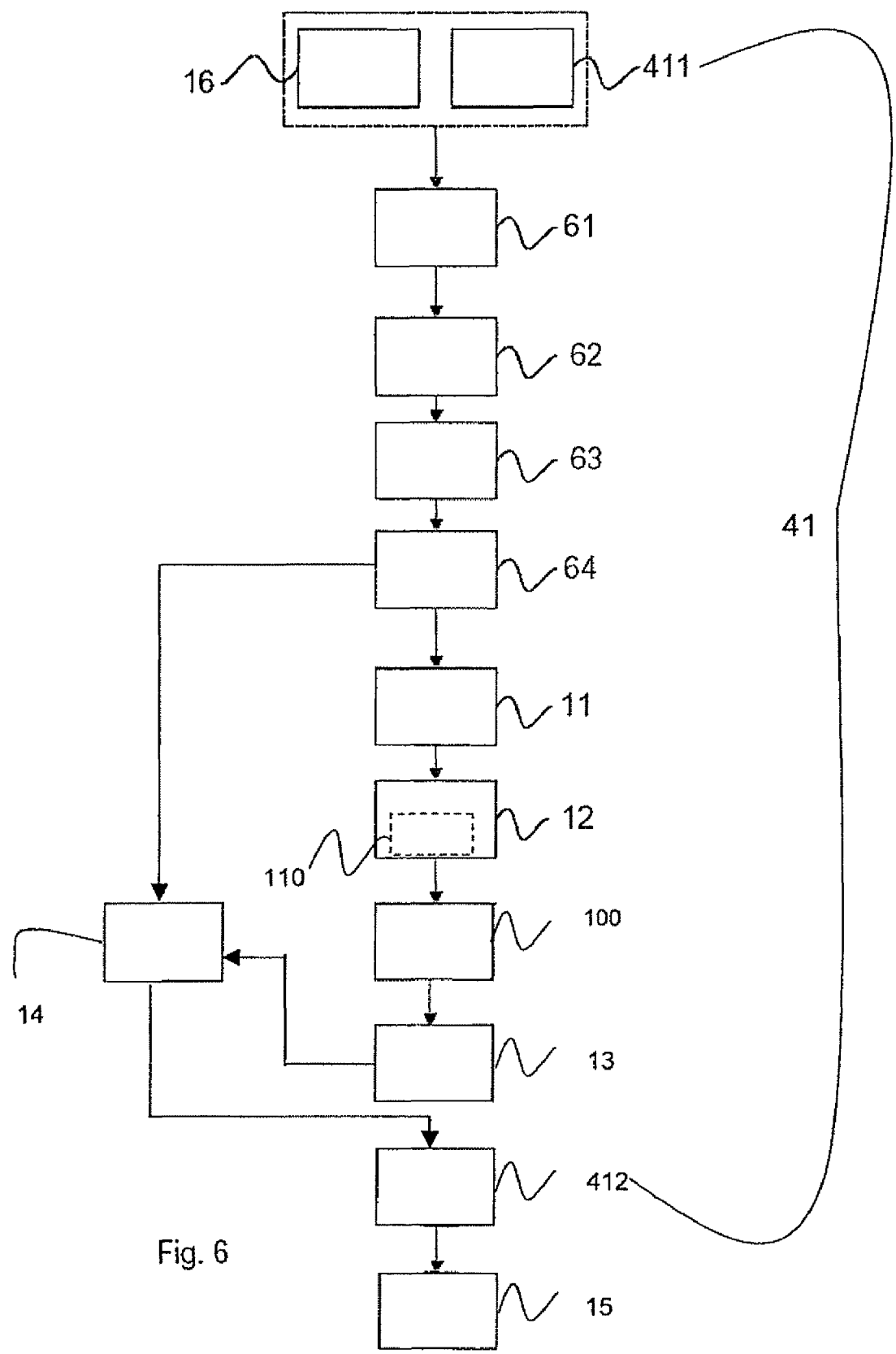
FIG. 6 is a schematic view of a method according to an embodiment of the present invention.

In an embodiment of the present invention, according to FIG. 6, the method further comprises:

performing 61 a low-pass filtering or a smoothing, on the first image dataset, e.g. by performing a convolution using an isotropic, symmetric Gaussian kernel, with the number of dimensions matching that of the image dataset (3D Gaussian kernel for a 2D image dataset sequence). This will in general reduce the high frequency noise in the first image dataset and prevent that noise is classified as foreground objects, i.e. relevant moving objects, in the succeeding foreground-background segmentation of the first image dataset.

In an embodiment of the present invention, the method further comprises performing 62 foreground-background segmentation, which identifies pixels that are occupied by a moving object, e.g. a pedestrian, and classifies those pixels as foreground pixels. Pixels that are identified as not being occupied by a moving object are classified as background pixels. There are currently various known methods that may be used for foreground-background segmentation in this embodiment. The foreground-background segmentation method is allowed to use the same number of image datasets preceding and succeeding the currently processed image, $n_b$ and $n_f$ as the calculation 11 step and the calculation 13 step.

In an embodiment of the present invention the method further comprises calculating 63 a summation kernel $\overline{S}$ using a summation function S. The summation function S is constructed from an auxiliary function G which in turn is constructed according to the characteristics of G listed in the SUMMATION KERNEL section. Further, a width matrix $\Sigma$ is constructed as $$\Sigma = \begin{bmatrix} \frac{1}{\sigma_{max}} & 0 & 0 \\ 0 & \frac{1}{\sigma_{min}} & 0 \\ 0 & 0 & \frac{1}{\sigma_{min}} \end{bmatrix}$$

in case the temporal coordinate amounts to the last coordinate in the coordinate system of the spatiotemporal space. The parameters $\sigma_{max} > \sigma_{min} \geq 0$ are preset constants corresponding to the maximum and minimum widths of the kernel.

The summation function is then constructed using $$S(\hat{x}) = G(\Sigma \hat{x})$$

i.e. without any rotation. The letter $\hat{x}$ represents the coordinates of a point in a local coordinate system in a neighborhood N, centered on the currently processed pixel $\overline{x}$.

Furthermore this embodiment comprises calculating a discrete summation kernel $\overline{S}$ by discretizing the summation function S according to the corresponding procedure in calculating 12 step.

The method further comprises calculating 64 a weighted intensity value for each pixel in the first image dataset, using $$O_i(\overline{x}) = \sum_{\hat{x} \in N} \overline{S}(\hat{x}) I(\overline{x} + \hat{x})$$

wherein $O(\overline{x})$ defines the intensity in pixel $\overline{x}$ in the first noise reduced output image dataset, $\overline{S}$ is the summation calculated for pixel $\overline{x}$ using the procedure detailed above and I is the input image. Since the same summation kernel $\overline{S}$ is used for each pixel $\overline{x}$ in the entire currently processed image dataset I the summation is easily and effectively performed using linear convolution.

After performing foreground-background segmentation the classified foreground pixels are processed in the calculation 11 step, the calculation 12 step, and the calculation 13 step. Additionally, the calculation 100 step for sharpening and the calculation step 110 for adapting the kernel to the local noise level may be included in the processing, as illustrated in FIG. 6. In an embodiment of the present invention, the storing 14 step comprises storing the entire or almost the entire processed image from the summation 63 as the noise reduced output image and then for every foreground pixel processed in the calculation 11 step, the calculation 12 step, and the calculation 13 step, store the output value in the corresponding pixel in the noise reduced first output image dataset. This means that the summation in the background pixels may be performed by the performing 64 step while the summation in the foreground pixels is performed by the calculation 11 step, the calculation 12 step, and the calculation 13 step. The advantage of this embodiment is inter alia that the background pixels, which most commonly constitute the larger area in a static image dataset sequence, are not put into the calculation 11 step, the calculation 12 step, and the calculation 13 step, which reduces the processing time of the method significantly without decreasing the resolution of the resulting noise reduced output image dataset.

Figure 7:
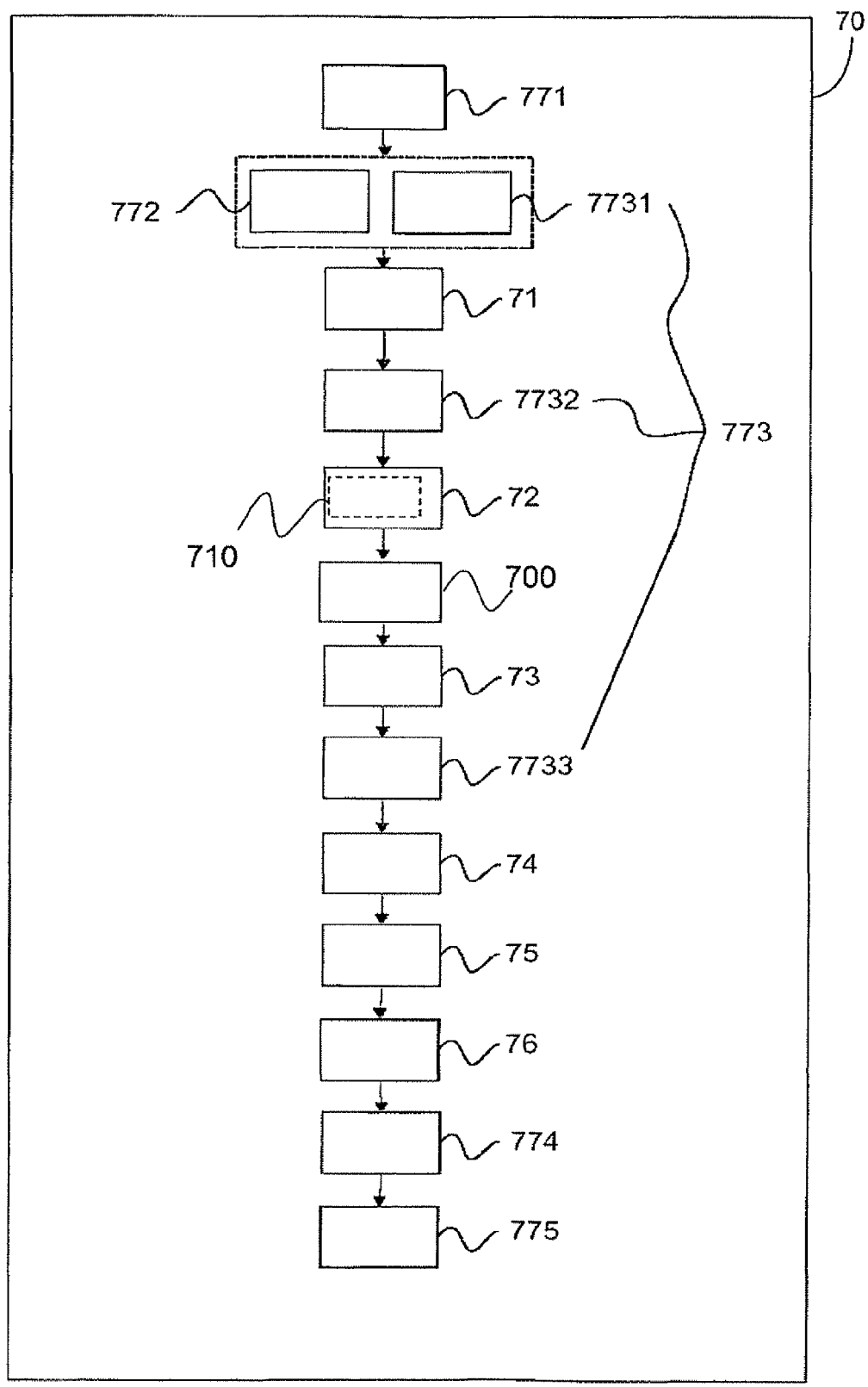
FIG. 7 is a schematic view of an apparatus according to an embodiment of the present invention.

In an embodiment of the present invention according to FIG. 7, an apparatus 70 for e.g. noise reduction in a sequence of image datasets is provided, for example in a sequence of night vision image datasets, wherein each image dataset has at least two pixels, wherein each pixel has an intensity value. The apparatus comprises a first calculation unit 71 for calculating a measure of the intensity structure for each pixel in a first image dataset comprised in the sequence of image datasets, a second calculation unit 72 for calculating a first summation kernel $\overline{S}$ based on the measure of the intensity structure in each pixel in the first image dataset, a third calculation unit 73 for calculating a weighted intensity value for each pixel in the first image dataset, using as the weight each corresponding pixel in the first summation kernel $\overline{S}$, and a storage unit 74 for storing the weighted intensity value for each pixel in the first image dataset as the intensity value for each corresponding pixel in a noise reduced first output image dataset.

In an embodiment of the present invention, the apparatus further comprises a setting unit 75 for setting an image dataset of the sequence subsequent to said first image dataset as said first image dataset.

In an embodiment of the present invention, the apparatus further comprises a repeating unit 76 for repeating the tasks of the first calculation unit 71, the second calculation unit 72, the third calculation unit 73 and the storage unit 74 until all image datasets of the sequence of image datasets have been processed.

In an embodiment of the present invention the apparatus comprises a first memory 771 capable of storing and deleting a sequence of image datasets or individual image datasets.

In some embodiments of the present invention, when an image dataset is no longer needed for the forthcoming processing from the first memory, e.g. when the image dataset precedes the currently processed image dataset by more than $n_b$ image datasets, the image dataset may be deleted from the first memory 771. The processing of each image dataset thus requires maximum $n_f$ image datasets succeeding and $n_b$ image datasets preceding the currently processes image dataset.

In an embodiment of the present invention the apparatus further comprises an image stabilization unit 772 for performing image stabilization if motion disturbance is present in the image dataset.

In an embodiment of the present invention the apparatus further comprises an intensity transformation unit 773 for performing intensity transformation 7731, 7732, 7733 of the currently processed image dataset.

In an embodiment of the present invention the apparatus further comprises render unit 774 for rendering the created output image dataset for visualization on a display 775.

The unit(s) may e.g. be in hardware, such as a processor with a memory. The processor could be any of variety of processors, such as Intel or AMD processors, CPUs, microprocessors, Programmable Intelligent Computer (PIC) microcontrollers, Digital Signal Processors (DSP), etc. However, the scope of the invention is not limited to these specific processors. The memory may be any memory capable of storing information, such as Random Access Memories (RAM) such as, Double Density RAM (DDR, DDR2), Single Density RAM (SDRAM), Static RAM (SRAM), Dynamic RAM (DRAM), Video RAM (VRAM), etc. The memory may also be a FLASH memory such as a USB, Compact Flash, SmartMedia, MMC memory, MemoryStick, SD Card, MiniSD, MicroSD, xD Card, TransFlash, and MicroDrive memory etc. However, the scope of the invention is not limited to these specific memories.

In an embodiment of the present invention the apparatus 70 is used in a vehicle for detection of moving objects around the vehicle by means of a camera, in particular e.g. by means of a night vision camera. As an example the camera may be placed in the forward direction of the vehicle to detect objects located in the vehicle path. The object may be animals or any moving or static object, which is difficult to discover using the human eye in dim light conditions such as during night vision. The camera is connected to the apparatus and a display for presentation. The great advantage of this embodiment is that animals or people present in front of the vehicle may be detected before the driver or passengers have detected them visually.

This embodiment could also be used as a part of a system for automatic detection of different objects such as pedestrians, animals, traffic signs, line markers etc using automatic image analysis techniques. The noise reduction method would then work as a pre-processing step for the succeeding automatic image analysis, making this analysis much more robust, efficient and flexible.

In an embodiment of the present invention the apparatus 70 comprises units arranged for performing all of the method steps defined in any one of the embodiments. For example, in an embodiment of the present invention a calculation unit for sharpening 700 and/or a calculation unit for adapting the kernel 710 to the local noise level may be included or may be incorporated in one of the calculation units.

Figure 8:
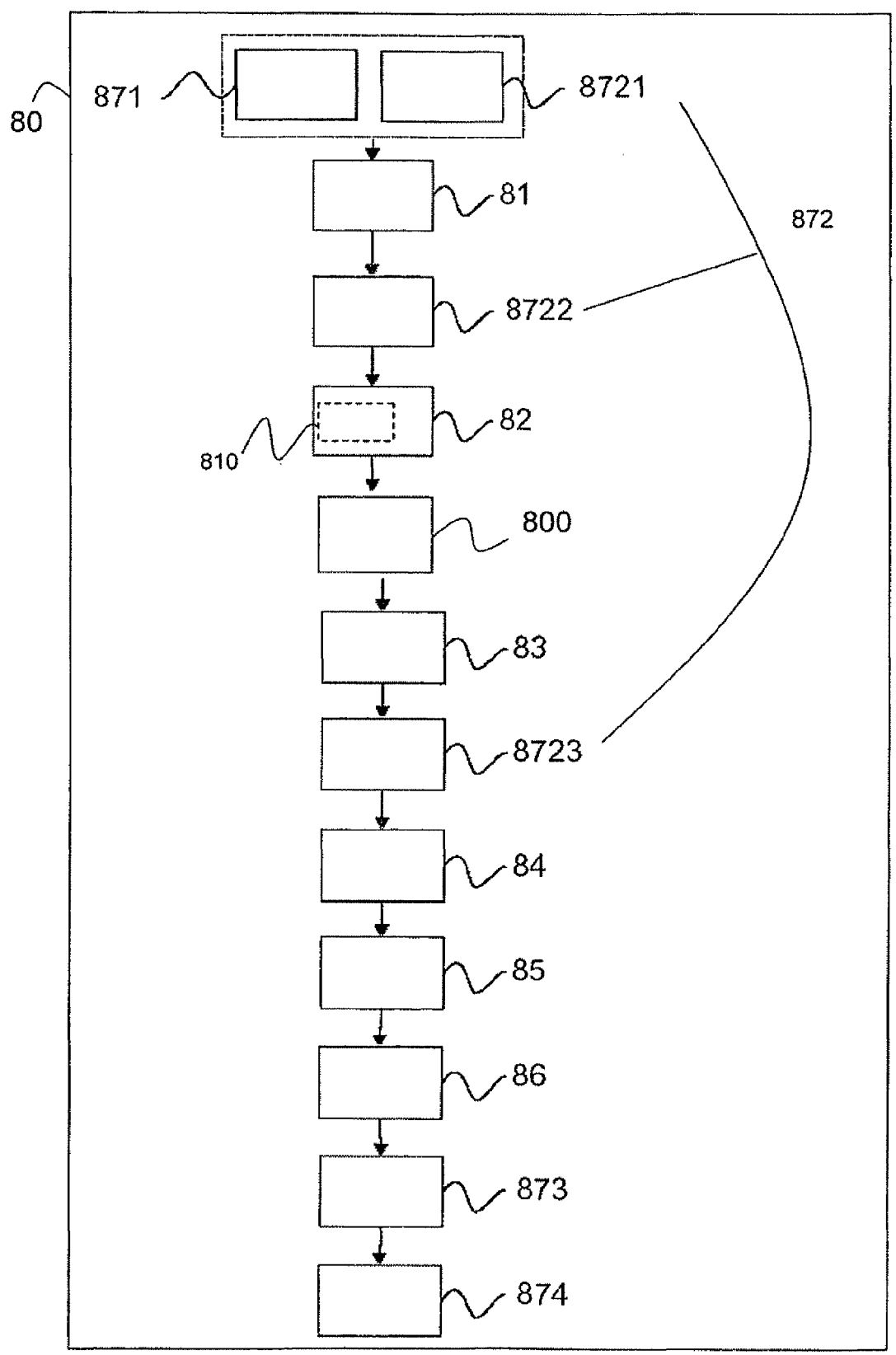
FIG. 8 is a schematic view of a computer-readable medium according to an embodiment of the present invention.

In an embodiment of the present invention, according to FIG. 8, a computer-readable medium 80 is provided having embodied thereon a computer program for processing by a computer for e.g. noise reduction in a sequence of image datasets, wherein each image dataset has at least two pixels, wherein each pixel has an intensity value. The computer program comprises a first calculation code segment 81 for calculating, based on estimated intensity derivatives in each pixel, a measure of the intensity structure, e.g. a structure tensor, for each pixel in a first image dataset comprised in the sequence of image datasets, and for performing an eigen-decomposition of said measure of the intensity structure, e.g. structure tensor, a second calculation code segment 82 for calculating a first summation kernel $\overline{S}$ based on the measure of the intensity structure, e.g. structure tensor, in each pixel in the first image dataset, a third calculation code segment 83 for calculating a weighted intensity value for each pixel in the first image dataset, using as the weight each corresponding pixel in the first summation kernel $\overline{S}$.

a storage code segment 84 for storing the weighted intensity value for each pixel in the first image dataset as the intensity value for each corresponding pixel in a noise reduced first output image dataset.

In embodiments of the present invention, the computer program comprises a further calculation code segment for rotating a local coordinate system in which the summation kernel is described resulting in that the coordinate axes of said local coordinate system coincide with the directions of the eigenvectors of said structure tensor, where said eigenvectors are described in the global coordinate system of the image dataset, and a scaling code segment for scaling the coordinate axes of the local coordinate system in which the summation kernel is described by an amount related to the eigenvalues of the structure tensor via a width function $w(\lambda_i)=\sigma_i$, and wherein said eigenvalues depend on the amount of intensity variation in the direction of their corresponding eigenvectors, the width function being a decreasing function depending on the noise level in each pixel $w(0)=\sigma_{max}$ and $\lim_{a\to\infty} w(a)=\sigma_{min}$. As an example, the width function may be defined by $$w(\lambda_i, x_0) = \begin{cases} \Delta\sigma e^{-\frac{\lambda_i}{d(x_0)}+\frac{1}{2}} + \sigma_{min}, & \lambda_i > \frac{d(x_0)}{2} \\ \sigma_{max}, & \lambda_i \leq \frac{d(x_0)}{2} \end{cases}.$$

In an embodiment of the present invention, the computer program further comprises a sharpening code segment 800, for constructing summation kernels $\overline{S}_H$ or $\overline{S}_h$ that provides sharpening at the most important spatial and temporal edges together with smoothing in other appropriate directions.

In an embodiment of the present invention, the computer program further comprises a calculation code segment 810 for adapting the kernel to the local noise level may be included in the processing, as illustrated in FIG. 8.

In an embodiment of the present invention, the computer program further comprises a setting code segment 85 for setting an image dataset of the sequence subsequent to said first image dataset as said first image dataset.

In an embodiment of the present invention, the computer program further comprises a repeating code segment 86 for repeating the tasks of the first calculation code segment 81, second calculation code segment 82, third calculation code segment 83 and storage code segment 84 until all image datasets of the sequence of image datasets have been processed.

In an embodiment of the present invention, the computer-readable medium further comprises an image stabilization code segment 871 for performing image stabilization if motion disturbance is present in the image dataset data.

In an embodiment of the present invention, the computer-readable medium further comprises an intensity transformation code segment 872 for performing intensity transformation 8721, 8722, 8723 of the currently processed image dataset.

In an embodiment of the present invention, the computer-readable medium further comprises render code segment 873 for rendering the created output image dataset for visualization on a display.

In an embodiment of the present invention, the computer-readable medium comprises code segments arranged, when run by an apparatus having computer processing properties, for performing all of the method steps defined in any one of the embodiments.

The invention may be implemented in any suitable form including hardware, software, firmware or any combination of hardware, software and firmware. The elements and components of an embodiment of the invention may be physically, functionally and logically implemented in any suitable way. Indeed, the functionality may be implemented in a single unit, in a plurality of units or as part of other functional units. As such, the invention may be implemented in a single unit, or may be physically and functionally distributed between different units and processors.

Combinations and modifications of the above-mentioned embodiments of the present invention should be able to be implemented by a person ordinary skilled in the art to which this invention belongs.

Applications and use of the above-described embodiments according to the invention are various and include all fields wherein dynamic enhancement, e.g. noise reduction, of an image dataset comprising low contrast areas is used. A noisy low contrast image dataset is e.g. obtained using a video camera or a still image camera in low-light conditions such as e.g. night vision conditions and/or in foggy, hazy, dusty and snowy conditions. The camera could for example be a consumer camera obtaining images for private use, a camera used for surveillance purposes, an imaging device used for industrial inspection purposes, an imaging device used for navigation of different kinds of vehicles or an imaging device used for different kinds of industrial and scientific measurements. In particular the camera could be a night vision camera. The above-mentioned imaging devices do not only comprise 2D cameras, but also microscopic 2D or 3D imaging devices, such as fluorescence microscopes where the resulting images generally are of low-contrast and very noisy or medical imaging device such as different kinds of scanning devices or tomographic devices such as MR imaging, computer tomography and x-ray imaging. The imaging devices may also comprise measuring equipment, which outputs multi-channel image datasets.

Although the present invention has been described above with reference to specific embodiments, it is not intended to be limited to the specific form set forth herein. Rather, the invention is limited only by the accompanying claims.

Some embodiments of the present invention may allow for combining an intensity transformation stage and a noise reduction stage. In the noise reduction stage an optimal or almost optimal spatiotemporal summation kernel may be found which may be used to calculate a weighted average (spatiotemporal summation) around each point. The shape of this summation kernel in general depends on the general intensity structure of the spatiotemporal space, without reference to which axis being the temporal axis and which axes being the spatial axes. The spatiotemporal intensity structure may be made up of the spatial structures in the scene and their motion in the image sequence.

An advantage of some embodiments of the present invention is that it, using a generally applicable methodology, may find an optimal or almost optimal summation kernel in the spatiotemporal space that may be used to calculate a weighted intensity value for each pixel in the image dataset. The calculation of this weighted intensity value may effectively reduce the noise and minimize the amount of spatial blur and motion blur and even sharpen some contours and edges in the image sequence, i.e. maximize the resolution in the output.

Another advantage with some embodiments of the present invention is that it is possible to reduce the noise in image datasets comprising low contrast, e.g. image datasets taken during very dim light conditions, especially during night vision conditions, thereby making it possible to improve the visibility in such image datasets.

Yet another advantage of some embodiments of the present invention is that the true colors of the objects in the image datasets can be preserved and the output image dataset thus contains all or almost all colors of the objects in the image dataset, as embodiments of the present invention may process multi-channel image data, such as triple channel RGB color data. The image dataset or sequence of image datasets may thus be taken by an ordinary camera detecting white light (400 nm-700 nm) in dim light conditions, e.g. night vision conditions, and thus have a clear advantage over IR detectors, which only detect light in the infrared interval above 700 nm, and which are currently used for dim light conditions such as night vision conditions.

In this specification and claims, the term "comprises/comprising" does not exclude the presence of other elements or steps. Furthermore, although individually listed, a plurality of means, elements or method steps may be implemented by e.g. a single unit or processor. Additionally, although individual features may be included in different claims, these may possibly advantageously be combined, and the inclusion in different claims does not imply that a combination of features is not feasible and/or advantageous. In addition, singular references do not exclude a plurality. The terms "a", "an", "first", "second" etc do not preclude a plurality. Reference signs in the claims are provided merely as a clarifying example and shall not be construed as limiting the scope of the claims in any way.

The invention claimed is:

1. A method for processing a sequence of night vision image datasets, wherein said sequence comprises at least two image datasets each having at least two pixels, wherein each pixel has an intensity value, said method comprising:
   calculating, based on estimated intensity derivatives in each pixel, a structure tensor for each pixel in an image dataset comprised in said sequence of image datasets, and performing an eigen-decomposition of said structure tensor,
   calculating values in a summation kernel based on said structure tensor for each pixel in said image dataset,
   calculating a weighted intensity value for each pixel in said image dataset, using as weights the values in said summation kernel, storing said weighted intensity value for each pixel in said image dataset as a processed intensity value for each corresponding pixel in a processed output image dataset,
the method furthermore comprising:
rotating a local coordinate system in which the summation kernel is described resulting in that the coordinate axes of said local coordinate system coincide with the directions of the eigenvectors of said structure tensor, where said eigenvectors are described in the global coordinate system of the image dataset, and
scaling the coordinate axes of the local coordinate system in which the summation kernel is described by an amount related to the eigenvalues of the structure tensor via a width function $w(\lambda_i)=\sigma_i$, and wherein said eigenvalues depend on the amount of intensity variation in the direction of their corresponding eigenvectors,
and in addition the width function being a decreasing function depending on the noise level in each pixel such that $w(0)=\sigma_{max}$ and $\lim_{a\to\infty} w(a)=\sigma_{min}$.

2. The method of claim 1 wherein the width function is defined by $$w(\lambda_i, x_0) = \begin{cases} \Delta\sigma e^{-\frac{\lambda_i}{d(x_0)}+\frac{1}{2}} + \sigma_{min}, & \lambda_i > \frac{d(x_0)}{2} \\ \sigma_{max}, & \lambda_i \leq \frac{d(x_0)}{2}. \end{cases}$$

3. The method according to claim 1, wherein adapting the width function to the noise level comprises estimating a noise in the image datasets and scaling an estimation of the variance of the noise so that the result is of a magnitude that is suitable for insertion in the width function.

4. The method according to claim 3, wherein scaling an estimation of the variance is performed by means of a fixed scaling factor, or wherein scaling an estimation of the variance is performed by means of a scaling factor which is determined from the image dataset.

5. The method according to claim 1, comprising:
repeating the method steps for subsequent image datasets.

6. The method according to claim 1, wherein said step of calculating a structure tensor comprises:
calculating the structure tensor based on the mean of the corresponding estimated intensity derivatives for each channel in each pixel when said image dataset is a multi-channel image dataset, or
calculating said structure tensor for each channel in said image dataset when said image dataset is a multi-channel image dataset.

7. The method according to claim 1, further comprising:
calculating the elementwise mean structure tensor of said structure tensors calculated for each channel in said image dataset when said image dataset is a multi-channel image dataset, or
calculating said structure tensor using the mean value of the values in each channel in said dataset when said image dataset is a multi-channel image data set.

8. The method according to claim 1, further comprising:
performing low-pass filtering of said image dataset before or during said step of calculating the structure tensor.

9. The method according to claim 1, wherein said step of calculating of the structure tensor further comprises:
calculating the motion vectors for each pixel of each image dataset of said sequence of image datasets.

10. The method according to claim 1, further comprising:
performing an intensity transformation on said image dataset by an intensity transformation function to increase the intensity contrast in at least a part of said first image dataset.

11. The method claim 1, further comprising:
rendering each of said first output image dataset for presentation on a display.

12. The method according to claim 1, further comprising performing a foreground-background segmentation or sharpening of the image.

13. The method according to claim 12, wherein the sharpening is obtained by convolution of the summation kernel with a high-boost filter giving the summation kernel $\overline{S}_H$ or wherein the sharpening is obtained by using a summation function $S_h$ obtained by approximating a discrete high-boost filter with a continuous function h and calculating a new summation function analytically by the convolution of the original summation kernel S with the function h, and discretizing the summation function $S_h$, giving the summation kernel $\overline{S}_h$.

14. An apparatus for processing a sequence of night vision image datasets, said sequence comprising at least two image datasets each having at least two pixels, wherein each pixel has an intensity value, said apparatus comprising:
a first calculation unit for calculating, based on estimated intensity derivatives in each pixel, a structure tensor for each pixel in an image dataset comprised in said sequence of image datasets, and performing an eigendecomposition of said structure tensor,
a second calculation unit for calculating values in a summation kernel based on said structure tensor for each pixel in said image dataset,
a third calculation unit for calculating a weighted intensity value for each pixel in said image dataset, using as weights the values in said summation kernel,
a storage unit for storing said weighted intensity value for each pixel in said image dataset as a processed intensity value for each corresponding pixel in a processed output image dataset,
wherein the apparatus further comprises:
a calculation unit for rotating a local coordinate system in which the summation kernel is described resulting in that the coordinate axes of said local coordinate system coincide with the directions of the eigenvectors of said structure tensor, where said eigenvectors are described in the global coordinate system of the image dataset, and
a scaling unit for scaling the coordinate axes of the local coordinate system in which the summation kernel is described by an amount related to the eigenvalues of the structure tensor via a width function $w(\lambda_i)=\sigma_i$, and wherein said eigenvalues depend on the amount of intensity variation in the direction of their corresponding eigenvectors,
and in addition the width function being a decreasing function depending on the noise level in each pixel such that $w(0)=\sigma_{max}$ and $\lim_{a\to\infty} w(a)=\sigma_{min}$.

15. The apparatus of claim 14, the width function being a decreasing function defined by $$w(\lambda_i, x_0) = \begin{cases} \Delta\sigma e^{-\frac{\lambda_i}{d(x_0)}+\frac{1}{2}} + \sigma_{min}, & \lambda_i > \frac{d(x_0)}{2} \\ \sigma_{max}, & \lambda_i \leq \frac{d(x_0)}{2}. \end{cases}$$

16. The apparatus according to claim 15, further comprising a repeating unit for repeating the above steps for subsequent image datasets.

17. A computer-readable medium having embodied thereon a computer program for processing by a processor of a sequence of image datasets, wherein said sequence comprises at least two image datasets, each image dataset having at least two pixels, wherein each pixel has an intensity value, said computer program comprising
- a first calculation code segment for calculating, based on estimated intensity derivatives in each pixel, a structure tensor for each pixel in an image dataset comprised in said sequence of image datasets, and for performing an eigen-decomposition of said structure tensor,
- a second calculation code segment for calculating values in a summation kernel based on said structure tensor for each pixel in said image dataset,
- a third calculation code segment for calculating a weighted intensity value for each pixel in said image dataset, using as weights the values in said summation kernel,
- a storage code segment for storing said weighted intensity value for each pixel in said image dataset as a processed intensity value for each corresponding pixel in a processed output image dataset,
- a further calculation code segment for rotating a local coordinate system in which the summation kernel is described resulting in that the coordinate axes of said local coordinate system coincide with the directions of the eigenvectors of said structure tensor, where said eigenvectors are described in the global coordinate system of the image dataset, and
- a scaling code segment for scaling the coordinate axes of the local coordinate system in which the summation kernel is described by an amount related to the eigenvalues of the structure tensor via a width function $w(\lambda_i)=\sigma_i$, and wherein said eigenvalues depend on the amount of intensity variation in the direction of their corresponding eigenvectors,
- and in addition the width function being a decreasing function depending on the noise level in each pixel such that $w(0)=\sigma_{max}$ and $\lim_{a\to\infty} w(a)=\sigma_{min}$.

18. A computer-readable medium according to claim 17, the width function being a decreasing function defined by $$w(\lambda_i, x_0) = \begin{cases} \Delta\sigma e^{-\frac{\lambda_i}{d(x_0)}+\frac{1}{2}} + \sigma_{min}, & \lambda_i > \frac{d(x_0)}{2} \\ \sigma_{max}, & \lambda_i \leq \frac{d(x_0)}{2}. \end{cases}$$

19. The computer-readable medium according to claim 17, further comprising a repeating code segment for repeating the above steps for subsequent image datasets.

* * * * *